(12) United States Patent
Ogasahara

(10) Patent No.: US 7,944,913 B2
(45) Date of Patent: May 17, 2011

(54) NODE, COMMUNICATION METHOD, AND PROGRAM FOR NODE

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 418 days.

(21) Appl. No.: 12/119,670

(22) Filed: May 13, 2008

(65) Prior Publication Data

US 2008/0285555 A1    Nov. 20, 2008

(30) Foreign Application Priority Data

May 17, 2007    (JP) .................................. 2007-131854

(51) Int. Cl.
  *H04L 12/66*    (2006.01)
  *H04L 12/26*    (2006.01)
(52) U.S. Cl. ........................................ 370/386; 370/216
(58) Field of Classification Search .................. None
  See application file for complete search history.

(56) References Cited

U.S. PATENT DOCUMENTS 6,298,061 B1 * 10/2001 Chin et al. .................... 370/400

FOREIGN PATENT DOCUMENTS

JP    2002-232427    8/2002

OTHER PUBLICATIONS

"IEEE Std 802.3ad Amendment to Carrier Sense Multiple Access with Collision Detection (CSMA/CD) Access Method and Physical Layer Specifications", "43.Link Aggregation", IEEE (Institute of Electrical and Electronics Engineers Inc), 2000, pp. 95-173.

* cited by examiner

*Primary Examiner* — Ayaz R Sheikh
*Assistant Examiner* — Blanche Wong
(74) *Attorney, Agent, or Firm* — Scully, Scott, Murphy & Presser, P.C.

(57) ABSTRACT

The present invention provides a node capable of preventing the problems caused by switching between traffic communication paths when a link failure occurs. According to an embodiment of the invention, among ports of a node 10, ports P1 and P2 connected to a link between the node 10 and a node 20 are registered in a virtual port VP1, and ports P3 and P4 connected to a link between the node 10 and the node 30 are registered in a virtual port VP2. The virtual ports VP1 and VP2 are registered in a virtual port VP3 allocated to a virtual LAG group. When one link between the node 10 and the node 20 is disconnected, the node 10 transmits frames, which have been transmitted from a physical port connected to the link, from the virtual port including the physical port, among the virtual ports belonging to the virtual port VP3 allocated to the virtual LAG group.

18 Claims, 21 Drawing Sheets

F I G. 3

| NODE IDENTIFIER OF DESTINATION NODE (DESTINATION INFORMATION) | PORT IDENTIFIER OF OUTPUT PORT (OUTPUT INFORMATION) |
|---|---|
| MAC ADDRESS OF NODE 200 | VP1 |
| MAC ADDRESS OF NODE 210 | VP2 |
| MAC ADDRESS OF NODE 300 | P5 |

| GROUP IDENTIFIER OF VIRTUAL LAG GROUP | PORT IDENTIFIER OF VIRTUAL PORT ALLOCATED TO VIRTUAL LAG GROUP | PORT IDENTIFIERS OF VIRTUAL PORTS BELONGING TO VIRTUAL LAG GROUP |
|---|---|---|
| VLG1 | VP3 | VP1,VP2 |

| GROUP IDENTIFIER OF LAG GROUP | PORT IDENTIFIER OF VIRTUAL PORT ALLOCATED TO LAG GROUP | PORT IDENTIFIERS OF PHYSICAL PORTS BELONGING TO LAG GROUP |
|---|---|---|
| LG1 | VP1 | P1,P2 |
| LG2 | VP2 | P3,P4 |

471

F I G. 6

| PORT IDENTIFIER OF VIRTUAL PORT | PORT IDENTIFIER OF VIRTUAL PORT ALLOCATED TO VIRTUAL LAG GROUP INCLUDING VIRTUAL PORT |
|---|---|
| VP1 | VP3 |
| VP2 | VP3 |
| VP3 | NULL |

531

F I G. 7

| PORT IDENTIFIER OF PHYSICAL PORT | PORT IDENTIFIER |
|---|---|
| P1 | VP1 |
| P2 | VP1 |
| P3 | VP2 |
| P4 | VP2 |
| P5 | P5 |

| PORT IDENTIFIER OF PHYSICAL PORT | PORT IDENTIFIER OF PORT THAT PERMITS TRANSMISSION OF BROADCAST FRAME |
|---|---|
| P1 | P5 |
| P2 | P5 |
| P3 | P5 |
| P4 | P5 |
| P5 | VP3 |

| PORT IDENTIFIER | PORT IDENTIFIER |
|---|---|
| VP1 | P1 |
| VP2 | P3,P4 |
| VP3 | VP1,VP2 |
| P5 | P5 |

461

F I G. 10
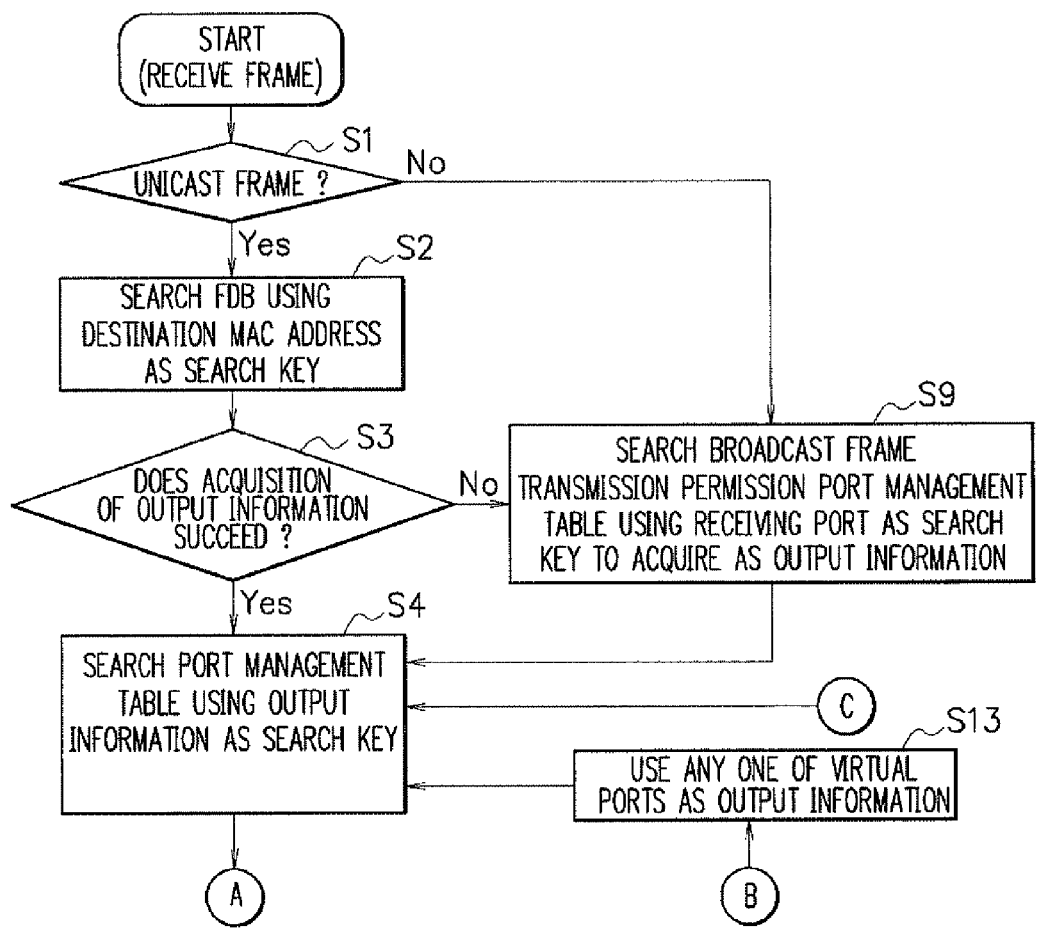

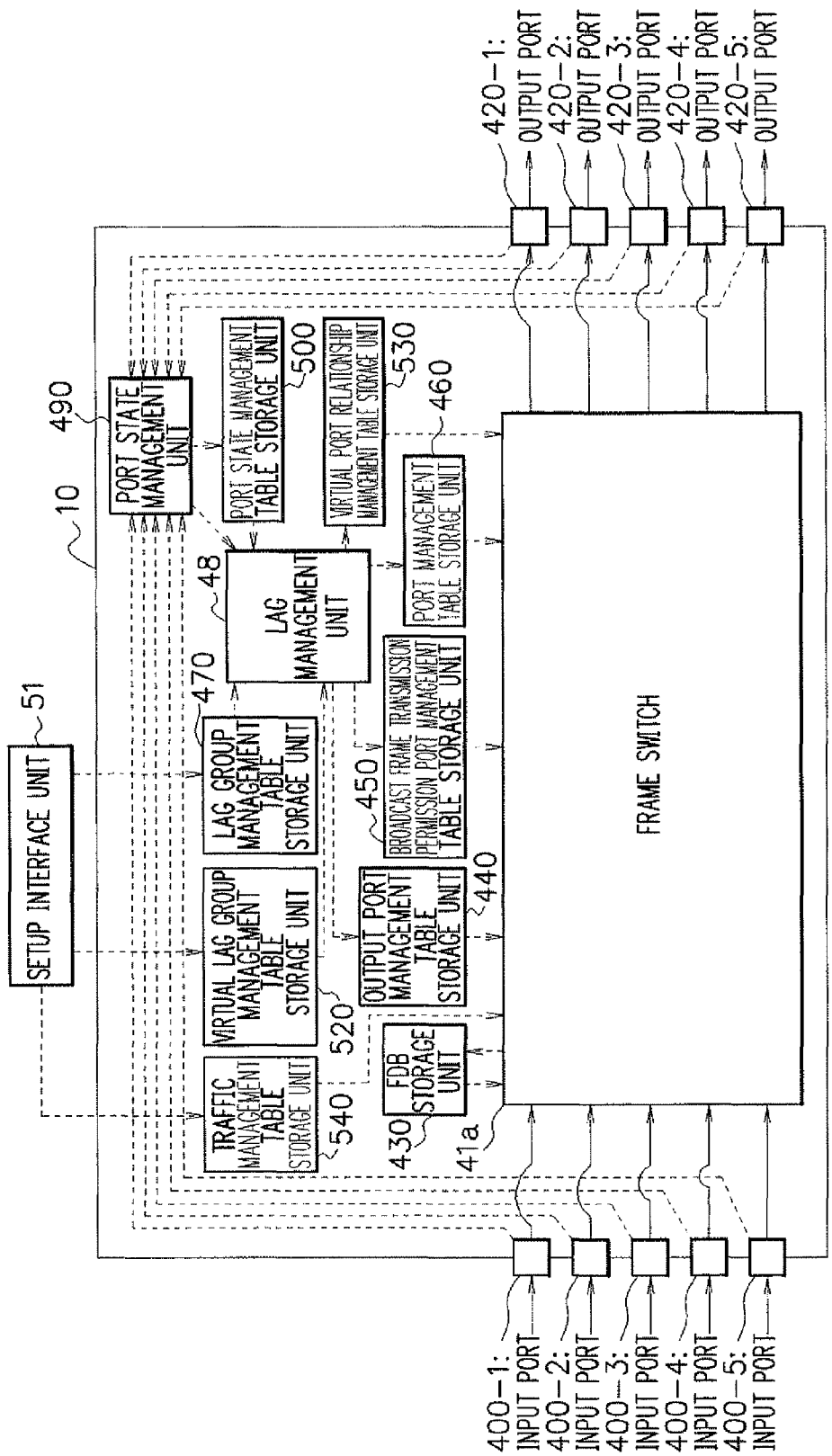
F I G. 12

F I G. 13

| VLAN IDENTIFIER | PORT IDENTIFIER |
|---|---|
| 1 | VP3 |
| 2 | VP3 |

541

F I G. 14

| NODE IDENTIFIER OF DESTINATION NODE (DESTINATION INFORMATION) | VLAN IDENTIFIER | PORT IDENTIFIER OF OUTPUT PORT (OUTPUT INFORMATION) |
|---|---|---|
| MAC ADDRESS OF NODE 200 | 1 | VP3 |
| MAC ADDRESS OF NODE 200 | 2 | VP3 |
| MAC ADDRESS OF NODE 200 | 3 | VP1 |
| MAC ADDRESS OF NODE 300 | 1 | P5 |
| MAC ADDRESS OF NODE 300 | 2 | P5 |
| MAC ADDRESS OF NODE 300 | 3 | P5 |

432

F I G. 15
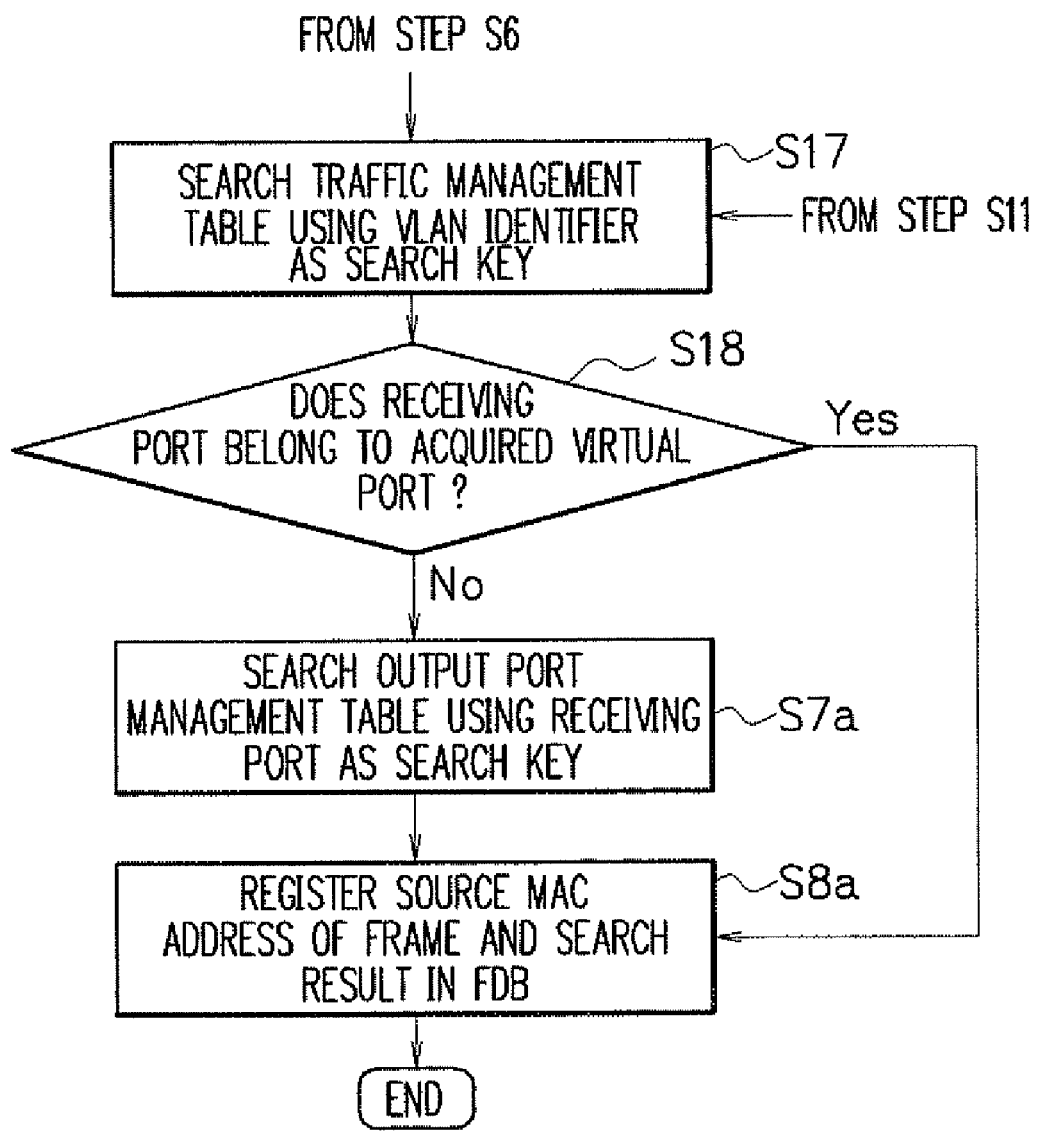

F I G. 18

| NODE IDENTIFIER OF DESTINATION NODE (DESTINATION INFORMATION) | PORT IDENTIFIER OF OUTPUT PORT (OUTPUT INFORMATION) |
|---|---|
| MAC ADDRESS OF NODE 200 | VP1 |
| MAC ADDRESS OF NODE 210 | VP1 |
| MAC ADDRESS OF NODE 300 | P5 |

431

F I G. 19

| PORT IDENTIFIER OF PHYSICAL PORT | PORT IDENTIFIER REGISTERED AS OUTPUT INFORMATION IN FDB |
|---|---|
| P1 | VP1 |
| P2 | VP1 |
| P3 | VP1 |
| P4 | VP1 |
| P5 | P5 |

441

F I G. 20

| PORT IDENTIFIER OF PHYSICAL PORT | PORT IDENTIFIER OF PORT THAT PERMITS TRANSMISSION OF BROADCAST FRAME |
|---|---|
| P1 | P5 |
| P2 | P5 |
| P3 | P5 |
| P4 | P5 |
| P5 | VP1 |

451

F I G. 21

| PORT IDENTIFIER | PORT IDENTIFIER |
|---|---|
| VP1 | P1,P3,P4 |
| P5 | P5 |

461

F I G. 22

| GROUP IDENTIFIER OF LAG GROUP | PORT IDENTIFIER OF VIRTUAL PORT ALLOCATED TO LAG GROUP | PORT IDENTIFIERS OF PHYSICAL PORTS BELONGING TO LAG GROUP |
|---|---|---|
| LG1 | VP1 | P1,P2,P3,P4 |

| PORT IDENTIFIER OF PHYSICAL PORT | PORT STATE |
|---|---|
| P1 | AVAILABLE |
| P2 | UNAVAILABLE |
| P3 | AVAILABLE |
| P4 | AVAILABLE |
| P5 | AVAILABLE |

501

NODE, COMMUNICATION METHOD, AND PROGRAM FOR NODE

This application is based upon and claims the benefit of priority from Japanese paten application No. 2007-131854, filed on May 17, 2007, the disclosure of which is incorporated herein in its entirety by reference.

BACKGROUND OF THE INVENTION

1. Field of the Invention

The present invention relates to a node, a communication method, and a program for a node, and more particularly, to a node, a communication method, and a program for a node capable of improving the reliability of communication.

2. Description of the Related Art

A backbone network that transfers a large amount of data traffic requires high reliability capable of preventing the interruption of communication even though a link between network nodes (hereinafter, simply referred to as nodes) is disconnected or the node is out of order. In order to meet the requirements, the following techniques have been developed: a link redundancy technique for virtualizing a plurality of links to one link; and a node redundancy technique for virtualizing a plurality of nodes to one node.

When it is necessary to specify a minimum unit serving as a link or a node, the link or the node is referred to as a physical link or a physical node, respectively. That is, the actual links between nodes are referred to as physical links, and the actual nodes installed on the network are referred to as physical nodes. In addition, a plurality of physical links that are virtualized to one link (regarded as one link) by the redundancy technique are referred to as a virtual link. Similarly, a plurality of physical nodes that are virtualized to one node (regarded as one node) by the redundancy technique are referred to as a virtual node. Further, when a link or a node is simply described, it means the physical link or the physical node.

Similarly, a minimum unit, serving as a port, is referred to as a physical port (or simply referred to as a port). That is, ports that are actually provided in the node are referred to as physical ports (or simply referred to as ports). A plurality of ports virtualized to one port (regarded as one port) is referred to as a virtual port.

Non-Patent Document 1 ("IEEE Std 802.3ad Amendment to Carrier Sense Multiple Access with Collision Detection (CSMA/CD) Access Method and Physical Layer Specifications", "43. Link Aggregation", IEEE (Institute of Electrical and Electronics Engineers, Inc), 2000, pp. 95-173) discloses a port redundancy technique called LAG (Link Aggregation). LAG is a port redundancy technique that is applicable to an Ethernet switch (or an Ethernet node) provided in an Ethernet network, which virtualizes a plurality of physical ports provided in the Ethernet switch to one physical port, thereby obtaining port redundancy. "Ethernet" is a registered trademark. Since the port of the Ethernet switch corresponds one-to-one with the link between the Ethernet switches, the LAG can be called a link redundancy technique.

Virtual ports are set by the LAG as follows: a plurality of physical ports provided in the Ethernet switch are classified into the same LAG group, and a port identifier that is not identical to the port identifiers of other physical ports and virtual ports of the Ethernet switch is allocated to the LAG group. Specifically, the virtual ports are set by registering the port identifier of a virtual port corresponding to the group identifier of a LAG group and the port identifiers of physical ports belonging to the LAG group in a LAG group management table 471 (see FIG. 22), which will be described below.

The port identifier allocated to the LAG group indicates a port identifier indicating the virtual port, but it can be processed similar to a port identifier indicating the physical port in a processor of transferring an Ethernet frame in the Ethernet switch.

When the virtual port is set, a technique for preventing a broadcast storm in the LAG and a technique for determining a frame destination are applied to the physical ports belonging to the LAG group.

The term "broadcast storm" means a state in which the communication band of a network is overwhelmed due to continuous transfer of broadcast frames between the Ethernet switches connected to each other by a plurality of links, which results in unstable communication conditions over the entire network. Since the structure in which the Ethernet switches are connected to each other by a plurality of links is called a loop structure, broadcast frames transferred from one Ethernet switch to another Ethernet switch continuously return to a source Ethernet switch, which causes the broadcast storm.

In the technique for preventing the broadcast storm problem in the LAG, the Ethernet frame input to a physical port belonging to a LAG group is not transmitted from another physical port belonging to the LAG group, thereby preventing the broadcast storm.

In the technique for determining a frame destination, when a port (output port) transmitting the Ethernet frame is a virtual port, the Ethernet frame is transmitted to one of the physical ports connected to the link that is not out of order, among the physical ports belonging to a LAG group corresponding to the virtual port. As a result, even when a link failure occurs, it is possible to continuously perform communication, and thus improve the reliability of communication.

Further, according to the technique for determining a frame destination, the Ethernet frames are dispersed to a plurality of links that are not out of order for transmission, which makes it possible to improve the reliability of communication and expand a communication band between the Ethernet switches. For example, a load balancing algorithm has been known which determines an output port for Ethernet frames on the basis of the process result obtained from some or all of the parameters, such as a VLAN (Virtual Local Area Network) identifier, a source MAC address, and a destination MAC address stored in a header field of the Ethernet frame. The technique for determining a frame destination using the load balancing algorithm when Ethernet frames are dispersed to a plurality of links that are not out of order has been applied to most of the current Ethernet frame communication systems on the market.

Next, the operation of the LAG will be described with reference to the drawings. FIGS. 16A to 16C are diagrams illustrating examples of the network to which the LAG is applied.

In the network shown in FIG. 16A, a node 100, a node 200, and a node 300 are Ethernet switches. Two links between the node 100 and the node 200 are virtualized to one virtual link by the LAG. In the network shown in FIG. 16A, ports P1 and P2 of the node 100 are registered in the same LAG group, and a port identifier VP1 is allocated to the LAG group. Similarly, ports P1 and P2 of the node 200 are registered in the same LAG group, and a port identifier VP1 is allocated to the LAG group. Since the node 100 and the node 200 are independent nodes, the LAG group of the node 100 is different from that of the node 200. Therefore, according to the structure in which two links between the node 100 and the node 200 are virtualized to one virtual link, even when one of the two physical links between the nodes 100 and 200 is disconnected, it is possible to continuously perform communication between the nodes 100 and 200 using the other physical link.

However, since only one physical link is connected between the node 100 and the node 300, no LAG is set to the port P3 of the node 100 and the port P1 of the node 300 that are connected by the physical link.

In FIG. 16A, link redundancy is achieved between the node 100 and the node 200 since the node 200 plays an important part in communication. In such a network configuration, for example, the node 200 may be a server, the node 300 may be a client terminal of the node 100, and the node 100 may be a switch connecting the server and the terminal. Alternatively, the node 200 may be a router, and the node 200 may also serve as a gateway connecting another network (not shown) and the node 100.

Each of the ports P1, P2, and P3 includes an input port that receives Ethernet frames and an output port that transmits Ethernet frames. It is assumed that one port including the input port and the output port in one node is connected to one port including the input port and the output port in another node by one link. For example, the input port and the output port of the port P1 of the node 100 are connected to the output port and the input port of the port P1 of the node 200 by one link, respectively.

Next, the network shown in FIG. 16B will be described. In the network shown in 16B, node redundancy is applied to the node 200 in the network shown in FIG. 16A. Since node redundancy technique is applied to the node 200 and a node 210 shown in FIG. 16B, the nodes 200 and 201 operate just like one physical node. The node 200 and the node 210 are redundantly configured such that the port P1 of the node 200 and the port P1 of the node 210 are registered in the same LAG group, and a port identifier VP1 is allocated to the LAG group. However, the necessity for registering the port P1 of the node 200 and the port P1 of the node 210 in the same LAG group depends on the kind of node redundancy technique.

As shown in FIG. 16B, any node redundancy technique may be used as long as it can connect a virtual node (the node 200 and the node 210) to another Ethernet switch (the node 100) by LAG.

When the ports P1 and P2 of the node 100 shown in FIG. 16B are registered in the same LAG group and the port identifier VP1 is allocated to the LAG group, the link between the node 100 and a virtual node composed of the node 200 and the node 210 is virtualized to one physical link. Therefore, the node 100 recognizes that the network configuration shown in FIG. 16B is completely identical to the network configuration shown in 16A.

In the network shown in FIG. 16A, when one of two links between the node 100 and the node 200 is disconnected, it is possible to continuously perform communication. However, when the node 200 is out of order, it is impossible to perform communication. Meanwhile, in the network shown in FIG. 16B, the node 100 can continuously perform communication even when the node 200 is out of order and the link between the node 200 and the node 100 is disconnected. Similarly, the node 100 can continuously perform communication even when the node 210 is out of order and the link between the node 210 and the node 100 is disconnected.

According to the technique for preventing the broadcast storm in the LAG, in the configuration shown in FIG. 16B, the Ethernet frame transmitted from the node 200 to the node 100 is not transferred to the node 210. Similarly, the Ethernet frame transmitted from the node 210 to the node 100 is not transferred to the node 200. Therefore, it is possible to prevent the broadcast storm.

Further, according to the technique for determining a frame destination in the LAG, the ports that are connected to the disconnected link, or the ports connected to the node that is out of order are not selected as output ports for Ethernet frames. Therefore, it is possible to continuously perform communication even when a link failure occurs. When no failure occurs, the node 100 disperses traffic to the node 200 and the node 210. Therefore, it is also possible to expand the communication band.

As in the network configuration shown in FIG. 16B, the use of both the node redundancy technique and the link redundancy technique makes it possible to improve the reliability of a network.

Next, the network shown in FIG. 16C will be described. In the network shown in FIG. 16C, the link between the node 100 and the node 200 and the link between the node 100 and the node 210 in the network shown in FIG. 16B are redundantly configured. This structure can further improve the reliability of a network.

In the network shown in FIG. 16C, the ports P1 and P2 of the node 200 and the ports P1 and P2 of the node 210 are registered in the same LAG group, and a port identifier VP1 is allocated to the LAG group. As described above, the setting of the LAG in the node 200 and the node 210 depends on the kind of node redundancy technique. Therefore, the setting of the LAG in the node 200 and the node 210 is just illustrative, but the ports P1 and P2 of the node 200 and the ports P1 and P2 of the node 210 do not necessarily belong to the same LAG group.

Among the physical ports P1 to P4 of the node 100, the physical ports P1 and P2 are connected to a link between the node 100 and the node 200, and the physical ports P3 and P4 are connected to a link between the node 100 and the node 210. The physical ports P1 to P4 of the node 100 are registered in the same LAG group, and a port identifier VP1 is allocated to the LAG group.

In this way, the node 100 is connected to both the node 200 and the node 210 by redundant links. Therefore, the network configuration shown in FIG. 16C has higher reliability than that shown in FIG. 16B.

Next, as a technique related to the invention, an example of the configuration of a general node used in the network shown in FIG. 16C will be described. FIG. 17 is a block diagram illustrating the configuration of the general node. The node 100 shown in FIG. 16C will be described below as an example. As shown in FIG. 17, the general node 100 includes input ports 400-1 to 400-5, a frame switch 410, output ports 420-1 to 420-5, an FDB storage unit 430, an output port management table storage unit 440, a broadcast frame transmission permission port management table storage unit 450, a port management table storage unit 460, a LAG group management table storage unit 470, a LAG management unit 480, a port state management unit 490, a port state management table storage unit 500, and a setup interface unit 510.

The input ports 400-1 to 400-5 of the node 100 are receiver-side ports in the ports P1 to P5 of the node 100 shown in FIG. 16C. That is, the input ports 400-1 to 400-5 of the node 100 receive Ethernet frames transmitted from adjacent nodes 200, 210, or 300. Specifically, the input port 400-1 of the node 100 receives Ethernet frames transmitted from a port P1 of the node 200. The input port 400-2 of the node 100 receives Ethernet frames transmitted from a port P2 of the node 200. The input port 400-3 of the node 100 receives Ethernet frames transmitted from a port P1 of the node 210. The input port 400-4 of the node 100 receives Ethernet frames transmitted from a port P2 of the node 210. The input port 400-5 of the node 100 receives Ethernet frames transmitted from a port P1 of the node 300.

Similarly, the output ports 420-1 to 420-5 of the node 100 are transmitter-side ports in the ports P1 to P5 of the node 100 shown in FIG. 16C. That is, the output ports 420-1 to 420-5 of the node 100 transmit Ethernet frames to adjacent nodes 200, 210, or 300. Specifically, the output port 420-1 of the node 100 transmits Ethernet frames to the port P1 of the node 200. The output port 420-2 of the node 100 transmits Ethernet frames to the port P2 of the node 200. The output port 420-3 of the node 100 transmits Ethernet frames to the port P1 of the node 210. The output port 420-4 of the node 100 transmits Ethernet frames to the port P2 of the node 210. The output port 420-5 of the node 100 transmits Ethernet frames to the port P1 of the node 300.

The frame switch 410 of the node 100 determines an output port that transmits the received Ethernet frame, on the basis of the content of an Ethernet frame header of the Ethernet frame received from the node 200, 210, or 300, and information registered in databases that are stored in the FDB storage unit 430, the broadcast frame transmission permission port management table storage unit 450, and the port management table storage unit 460, and then transmits the Ethernet frames from the determined output port.

The FDB storage unit 430 of the node 100 is a storage device that stores an FDB (Forwarding DataBase). The FDB is a database that registers destination information of an Ethernet frame and the port identifier of a port transmitting the Ethernet frame such that they are associated with each other. The port identifier of the port transmitting the Ethernet frame is not limited to the port identifier of a physical port, but it may be the port identifier of a virtual port. The port identifier of the port transmitting the Ethernet frame may be called output information. The FDB stored in the FDB storage unit 430 is updated or referred to by the frame switch 410 of the node 100.

FIG. 18 is a diagram illustrating an example of the FDB stored in the FDB storage unit 430 of the node 100. As the destination information of the Ethernet frame, a destination node identifier, that is, a destination MAC address is registered in an FDB 431 stored in the FDB storage unit 430 of the node 100. In addition, the port identifiers of physical ports or the port identifiers of virtual ports provided in a node (in this case, the node 100) are registered in the FDB as output information corresponding to a destination node identifier (destination MAC address). For example, a first entry of the FDB 431 of the node 100 shown in FIG. 18 means that, when the destination MAC address of the received Ethernet frame is the MAC address of the node 200, an output port transmitting the Ethernet frame is a port VP1.

The node viewed from a certain component means a node including the component itself.

The operation of the Ethernet switch registering the correspondence between the destination information and the output information of the Ethernet frame in the FDB is generally called MAC address learning. The operation of the MAC address learning will be described below.

The output port management table storage unit 440 of the node 100 is a storage device that stores an output port management table. The output port management table is a database in which output information is associated with physical ports P1 to P5 provided in a node (in this case, the node 100), and indicates output information to be registered in the FDB 431 when the MAC address learning is performed on the basis of the Ethernet frames received from the physical ports P1 to P5 provided in the node. The frame switch 410 refers to the output port management table during the MAC address learning, thereby searching output information to be registered in the FDB 431.

FIG. 19 is a diagram illustrating an example of the output port management table stored in the output port management table storage unit 440 of the node 100. In an output port management table 441 stored in the output port management table storage unit 440, port identifiers to be registered in the FDB 431 as output information during the MAC address learning are registered to the port identifiers (in FIG. 19, port identifiers P1 to P5) of the physical ports receiving Ethernet frames. For example, a first entry of the output port management table 441 of the node 100 shown in FIG. 19 means that, when the frame switch 410 of the node 100 performs the MAC address learning using the Ethernet frame received by the port P1, a source MAC address stored in the Ethernet frame is registered in a destination information field of the FDB 431 stored in the FDB storage unit 430 of the node and a port identifier VP1 is registered in the output information field.

In addition, the port identifiers of the physical ports provided in the node (in this case, the node 100) are registered as initial values of the output port management table 441. Therefore, when the frame switch 410 performs the MAC address learning immediately after the node 100 starts, the port identifier of the physical port receiving the Ethernet frame is registered as output information in the FDB 431 of the node 100.

After an initial state, the LAG management unit 480 updates the output port management table 441. The update of the output port management table 441 will be described below.

The broadcast frame transmission permission port management table storage unit 450 of the node 100 is a storage device that stores a broadcast frame transmission permission port management table. The broadcast frame transmission permission port management table is a database in which the physical ports provided in the node are associated with all the ports that permit the transmission of the broadcast frames received by the physical ports. When transmitting the received broadcast frame to another node, the frame switch 410 refers to the broadcast frame transmission permission port management table.

FIG. 20 is a diagram illustrating an example of the broadcast frame transmission permission port management table stored in the broadcast frame transmission permission port management table storage unit 450 of the node 100. As shown in FIG. 20, in a broadcast frame transmission permission port management table 451, the port identifiers (in FIG. 20, port identifiers P1 to P5) of the physical ports receiving broadcast frames are registered so as to be associated with the port identifiers of all of the physical ports or the virtual ports that permit the transmission of the broadcast frames. For example, a first entry of the broadcast frame transmission permission port management table 451 of the node 100 shown in FIG. 20 means that, when the port P1 receives a broadcast frame, only the port P5 is permitted to transmit the broadcast frame.

The broadcast frame transmission permission port management table 451 is updated by the LAG management unit 480 of the node. The update process will be described below.

The port management table storage unit 460 of the node 100 is a storage device that stores a port management table. The port management table is a database in which the port identifiers of physical ports capable of transmitting/receiving Ethernet frames are registered for each virtual port allocated to a LAG group of a node (here, the node 100), and for each physical port that does not belong to any LAG group.

The port management table is updated by the LAG management unit 480 of the node. The operation of the LAG management unit 480 updating the port management table will be described below. The frame switch 410 refers to the port management table when transmitting the received frame to another node.

In the port management table stored in the port management table storage unit 460, the port identifiers of the physical ports capable of transmitting/receiving Ethernet frames among the physical ports belonging to each virtual port are registered for the port identifier of each of the virtual ports set in the node. When all the physical ports belonging to the virtual ports cannot transmit or receive Ethernet frames, a value (for example, a NULL value) indicating that there is no physical port capable of transmitting or receiving Ethernet frames is registered in correspondence with the port identifier of the virtual port.

Further, in the port management table, among the physical ports provided in the node (here, the node 100), the port identifiers of the physical ports that do not belong to any LAG group set in the node are registered so as to be associated to their own port identifiers or a value (for example, a NULL value) indicating that there is no physical port capable of transmitting/receiving Ethernet frames. When the physical ports that do not belong to any LAG group set in the node are capable of transmitting or receiving Ethernet frames, the port identifiers of the physical ports are registered. When the physical ports are incapable of transmitting or receiving Ethernet frames, the value (for example, a NULL value) indicating that there is no physical port capable of transmitting/receiving Ethernet frames is registered.

FIG. 21 is a diagram illustrating an example of the port management table stored in the port management table storage unit 460 of the node 100. A first entry of the port management table 461 shown in FIG. 21 means that, among the physical ports belonging to the virtual port VP1, the ports P1, P3, and P4 are capable of transmitting or receiving Ethernet frames. In addition, a second entry of the port management table 461 shown in FIG. 21 means that the physical port P5 of the node is capable of transmitting or receiving Ethernet frames.

The LAG group management table storage unit 470 of the node 100 is a storage device that stores a LAG group management table. The LAG group management table is a database in which LAG groups set in the node, the port identifiers of the virtual ports allocated to the LAG groups, and the physical ports belonging to the LAG groups are associated with one another. For example, in the database, the group identifiers of the LAG groups set in the node, the port identifiers of the virtual ports allocated to the LAG groups, and the port identifiers of the physical ports belonging to the LAG groups are associated with each other.

The setup interface unit 510 is a user interface that allows a node administrator to update the LAG group management table (registration or modification of data). The setup interface unit 510 is operated by the administrator and updates the LAG group management table in response to instructions from the administrator. That is, the administrator operates the setup interface unit 510 to register data in the LAG group management table. When the LAG group management table is updated, the LAG management unit 480 refers to the LAG group management table to update the output port management table 441, the broadcast frame transmission permission port management table 451, and the port management table 461.

The port identifier of the virtual port allocated to a LAG group may be registered so as not to be identical to the port identifier of the virtual port allocated to another LAG group set in the node and the port identifiers of the physical ports provided in the node. In addition, the same physical port cannot be registered in a plurality of LAG groups.

In addition, each processor in the node is configured so as to determine whether the port identifier is of a physical port or a virtual port. In the example shown in the specification, the physical port includes a port identifier starting from "p", and the virtual port includes a port identifier starting from "VP". In this way, it is possible to discriminate the port identifier of the physical port from the port identifier of the virtual port.

FIG. 22 is a diagram illustrating an example of the LAG group management table stored in the LAG group management table storage unit 470 of the node 100. As shown in FIG. 22, in the LAG group management table 471, the group identifier of a LAG group, the port identifier of the virtual port allocated to the LAG group, and the port identifiers of one or more physical ports belonging to the LAG group are registered as to be associated with each other. A first entry of the LAG group management table 471 shown in FIG. 22 means that the port identifier VP1 of the virtual port is allocated to a LAG group LG1 and physical ports P1, P2, P3, and P4 belong to the LAG group.

The LAG management unit 480 of the node 100 updates the output management table 441 and the broadcast frame transmission permission port management table 451 with reference to the LAG group management table 471 stored in the LAG group management table storage unit 470 of the node. In addition, the LAG management unit 480 updates the port management table 461 with reference to the LAG group management table 471 and the port state management table stored in the port state management table storage unit 500. The port state management table will be described below with reference to FIG. 23.

The port state management unit 490 of the node 100 determines the states of the ports P1 to P5 of the node 100, on the basis of whether the input ports 400-1 to 400-5 of the node 100 are capable of receiving Ethernet frames and whether the output ports 420-1 to 420-5 of the node 100 are capable of transmitting Ethernet frames, and registers the determination results in the port state management table stored in the port state management table storage unit 500 of the node 100.

Further, when the port state management table of the node is updated, the port state management unit 490 notifies the LAG management unit 480 of the node that the port state management table has been updated.

The port state management table storage unit 500 of the node 100 is a storage device that stores the port state management table. The port state management table is a database that manages the state of each physical port in the node. Specifically, the port state management table is a database in which the port identifier of each physical port in the node is associated with information indicating whether the physical port is available or unavailable. The "available physical port" means a physical port that is capable of transmitting/receiving data, and the "unavailable physical port" means a physical port that is incapable of transmitting/receiving data.

The port state management unit 490 updates the available or unavailable state of each physical port in the port state management table. In addition, the LAG management unit 480 refers to the port state management table to update the output management table 441, the broadcast frame transmission permission port management table 451, and the port management table 461.

FIG. 23 is a diagram illustrating an example of the port state management table stored in the port state management table storage unit 500 of the node 100. As shown in FIG. 23, the port identifiers of the physical ports provided in the node and the states of the physical ports are registered in the port state management table 501 stored in the port state management table storage unit 500. When the physical ports are capable of transmitting/receiving Ethernet frames, the physical ports are registered as an "available state", but when the physical ports are incapable of transmitting/receiving Ethernet frames, the physical ports are registered as an "unavailable state". For example, a first entry of the port state management table 501 shown in FIG. 23 means that the port state of the physical port P1 is available and thus the physical port P1 is capable of transmitting/receiving Ethernet frames. On the other hand, a second entry of the port state management table 501 shown in FIG. 23 means that the port state of the physical port P2 is unavailable and thus the physical port P2 is incapable of transmitting/receiving Ethernet frames.

Next, the operation of the general node (see FIG. 17) will be described below. Hereinafter, the operation of the LAG management unit 480 of the general node 100 shown in FIG. 16C will be described.

When the administrator of the node 100 uses the setup interface unit 510 to update the LAG group management table 471 (see FIG. 22), the LAG management unit 480 updates the output port management table 441, the broadcast frame transmission permission port management table 451, and the port management table 461 of the node, on the basis of the content of the updated LAG group management table 471 stored in the LAG group management table storage unit 470 of the node (here, the node 100). Next, a process of updating each table will be described.

First, a process of updating the output port management table 441 stored in the output port management table storage unit 440 will be described. It is assumed that the physical ports provided in the node are registered as physical ports that to belong to LAG groups in the updated LAG group management table 471. That is, it is assumed that the port identifiers of the physical ports provided in the node are registered in the LAG group management table 471 so as to be associated with LAG group identifiers and the port identifiers of the virtual ports allocated to the LAG groups. In this case, the LAG management unit 480 registers the port identifier of the virtual port allocated to the LAG group, as the port identifier to be registered as output information in the FDB, in the output port management table 441 (see FIG. 19) so as to be associated with the port identifiers of the physical ports. In addition, the LAG management unit 480 registers the port identifiers of the physical ports that do not belong to any LAG group among the physical ports provided in the node, as the port identifiers to be registered as output information in the FDB, in the output port management table 441 (see FIG. 19). That is, for the physical ports whose identifiers are not registered in the LAG group management table 471 among the physical ports provided in the node, the LAG management unit 480 registers the port identifiers of the physical ports in the output port management table 441 so as to be associated with their own port identifiers.

For example, it is assumed that the LAG group management table 471 is updated as shown in FIG. 22. In this case, the physical ports P1 to P4 of the node are associated with the port identifier VP1 of the virtual port. Therefore, the LAG management unit 480 registers the port identifier VP1 of the virtual port in the output port management table 441 so as to be associated with each of the port identifiers P1 to P4 of the physical ports. FIG. 19 shows the output port management table in this state. The physical port P5 among the physical ports in the node is not registered in the LAG group management table 471. Therefore, as shown in FIG. 19, the LAG management unit 480 registers the port identifier P5 of the physical port so as to be associated with its own port identifier P5.

When the LAG group management table 471 (see FIG. 22) is updated, the LAG management unit 480 also updates the broadcast frame transmission permission port management table 451 (see FIG. 20) as follows. The LAG management unit 480 determines whether each of the physical ports provided in the node (here, the node 100) is registered as physical ports that belong to the LAG group in the updated LAG group management table 471. Then, the LAG management unit 480 associates the physical ports that are registered in the LAG group management table 471 as physical ports that belong to the LAG groups with their own port identifiers in the broadcast frame transmission permission port management table 451. In addition, the LAG management unit 480 registers the port identifiers of all the physical ports that do not belong to any LAG group, among the port identifiers of the virtual ports allocated to all the LAG groups except for the LAG group including the physical ports and the physical ports provided in the node.

Meanwhile, for a physical port (referred to as a physical port A) that does not belong to any LAG group and is not registered in the LAG group management table 471, the LAG management unit 480 registers, in the broadcast frame transmission permission port management table 451, the port identifiers of the virtual ports allocated to each LAG group and the port identifiers of all the physical ports except for the physical port A among all the physical ports that do not belong to any LAG group so as to be associated with the port identifier of the physical port A.

For example, it is assumed that the LAG group management table 471 is updated as shown in FIG. 22. In this case, the LAG management unit 480 determines that the physical port P1 belongs to a LAG group LG1 and is registered in the LAG group management table 471 with reference to the LAG group management table 471. Therefore, the LAG management unit 480 registers the physical port P1 in the broadcast frame transmission permission port management table 451 so as to be associated with the port identifiers P5 of all the physical ports that do not belong to any LAG group. In this example, since LAG groups other than the LAG group including the physical port P1 are not set, there are no LAG groups other than the LAG group including the physical port P1. Therefore, the port identifiers of the virtual ports allocated to these LAG groups are not registered, but only P5 is registered for P1. FIG. 20 shows the broadcast frame transmission permission port management table in this state. Similarly, only P5 is associated with P2 to P4. In addition, the LAG management unit 480 determines that P5 does not belong to any LAG group with reference to the LAG group management table 471. Therefore, the LAG management unit 480 registers the port identifier of the virtual port (in this example, VP1) allocated to each LAG group in the broadcast frame transmission permission port management table 451 so as to be associated with P5 (see FIG. 20). In addition, since only the physical port P5 does not belong to any LAG group in this example, the port identifier of the physical port is not registered so as to be associated with P5. As described above, when the LAG group management table 471 is updated as shown in FIG. 22, the broadcast frame transmission permission port management table 451 is set in the state shown in FIG. 20 by the LAG management unit 480.

Furthermore, the LAG management unit 480 of the node 100 updates the port management table 461 stored in the port management table storage unit 460 with reference to the LAG group management table 471 and the port state management table 501 (see FIG. 23) stored in the port state management table storage unit 500. That is, the LAG management unit 480 searches the port identifier of the virtual port allocated to each LAG group set in the node, with reference to the LAG group management table 471. Then, the LAG management unit 480 determines whether one or more physical ports (physical ports belonging to the LAG group) that are associated with the port identifier of each of the searched virtual ports are available or unavailable with reference to the port state management table 501, and selects the port identifiers of all the physical ports that are determined as available. The LAG management unit 480 registers, in the port management table 461, the port identifiers of the virtual ports searched from the LAG group management table 471 and the port identifiers of all the physical ports that are determined as available among the physical ports associated with the port identifier of each virtual port such that they are associated with each other. In this case, when the port identifiers of the physical ports that are determined as unavailable are registered in the port management table 461 so as to be associated with the port identifier of each of the searched virtual ports, the LAG management unit 480 deletes the port identifiers of the physical ports that are determined as unavailable from the port management table 461. When there is no physical port that is determined as available, the LAG management unit 480 registers the port identifiers of the virtual ports and a value indicating that there is no physical port capable of transmitting/receiving data in the port management table 461 such that they are associated with each other. In the following description, a NULL value is used as the value indicating that there is no physical port capable of transmitting/receiving data.

The LAG management unit 480 determines whether the port identifiers of the physical ports that do not belong to any LAG group (that is, the port identifiers of the physical ports that are not registered in the LAG group management table 471) among the physical ports in the node are available or unavailable with reference to the port state management table 501. When it is determined that that physical ports are available, the LAG management unit 480 registers the port identifiers of the physical ports in the port management table 461 so as to be associated with their own port identifiers. On the other hand, when it is determined that that physical ports are unavailable, the LAG management unit 480 registers the port identifiers of the physical ports in the port management table 461 so as to be associated with the NULL value.

FIG. 21 shows an example of the port management table 461 when the LAG group management table 471 is updated as shown in FIG. 22 and the port state management table 501 is updated as shown in FIG. 23. Among the physical ports P1 to P4 corresponding to the port identifier VP1 of the virtual port (see FIG. 22), the physical ports P1, P3, and P4 are available (see FIG. 23). Therefore, in the port management table 461, P1, P3, and P4 are associated with VP1 (see FIG. 21). In addition, since the physical port P5 that does not belong to any LAG group is available (see FIG. 23), the physical port P5 is associated with its own port identifier P5 in the port management table 461 (see FIG. 21).

The LAG management unit 480 updates the port management table 461 of the node when the LAG group management table 471 of the node is updated as well as when notified of the update of the port state management table 501 of the node from the port state management unit 490 of the node. In addition, the LAG management unit 480 may check whether the port state management table 501 stored in the port state management table storage unit 500 of the node is updated at a predetermined time interval, and update the port management table 461 when it is checked that the port state management table 501 has been updated.

Next, the frame transfer operation of the general node shown in FIG. 17 will be described. FIG. 24 is a flowchart illustrating the frame transfer operation of the general node. In the following description, in the network shown in FIG. 16C, when the port P5 of the node 100 receives the Ethernet frame transmitted from the port P1 of the node 300 and then the node 100 transmits the Ethernet frame to the node 200 or the node 210, the operation of the general node transferring Ethernet frames will be described.

When receiving the Ethernet frame transmitted from the port P1 of the node 300, the input port 400-5 of the node 100 transmits the Ethernet frame to the frame switch 410 of the node. The frame switch 410 determines whether the received Ethernet frame is a unicast frame (Step S1).

When it is determined that the received Ethernet frame is a unicast frame (Yes in Step S1), the frame switch 410 searches the FDB 431 stored in the FDB storage unit 430 of the node, using a destination MAC address stored in a header of the Ethernet frame as a search key, to acquire output information (Step S2). That is, the frame switch 410 acquires the port identifier of a port transmitting the Ethernet frame from the FDB 431.

When the acquisition of the output information fails in Step S2 (No in Step S3), the frame switch 410 searches the broadcast frame transmission permission port management table 451 stored in the broadcast frame transmission permission port management table storage unit 450 using the port identifier of a receiving port (in this case, P5) that receives the Ethernet frame as a search key. Then, the frame switch 410 acquires as output information all the port identifiers corresponding to the port identifier of the receiving port that receives the Ethernet frame (Step S9). Assuming that the broadcast frame transmission permission port management table 451 shown in FIG. 20 is generated, the frame switch 410 acquires VP1 corresponding to P5. Then, the frame switch 410 performs the process after Step S4 using the port identifier acquired in Step S9 as output information. When a plurality of port identifiers are acquired as the output information in Step S9, Steps S4, S5, S6, and S11 are performed on the port identifiers.

The frame switch 410 searches the port management table 461 stored in the port management table storage unit 460 of the node, using the output information acquired by searching (output information acquired in Step S9 or Step S2) as a search key, to acquire a port identifier corresponding to the output information (Step S4). In Step S4, the port identifier of the physical port or the NULL value is acquired from the port management table 461.

Subsequently, the frame switch 410 determines whether the port identifier acquired in Step S4 is of the physical port (Step S5). When a NULL value is acquired as data corresponding to output information in Step S4, the frame switch 410 determines that the port identifier is not of the physical port (No in Step S5), and discards the received Ethernet frame (Step S11). Then, the process proceeds to Step S7. If the data acquired in Step S4 is not the NULL value, the frame switch 410 determines that the acquired port identifier is of the physical port (Yes in Step S5), and the process proceeds to Step S6.

The port identifiers of one or more physical ports may be acquired in Step S4. In Step S6, the frame switch 410 selects one of the port identifiers acquired in Step S4, and transmits the received Ethernet frame from a physical port corresponding to the selected port identifier (Step S6).

When one port identifier is acquired from the port management table 461 by searching in Step S4, the frame switch 410 transmits the Ethernet frame from the output port of a physical port corresponding to the port identifier.

On the other hand, if a plurality of port identifiers are acquired, the frame switch 410 selects one of the plurality of port identifiers, and transmits the Ethernet frame from the output port of a physical port corresponding to the selected port identifier in Step S6. As a method of selecting one of the plurality of port identifiers, the following can be used: some or all of the information items stored in the received Ethernet frame are used as parameters, and one of the port identifiers corresponding to the parameters is selected. The information stored in the Ethernet frame means, for example, the content of a header of the Ethernet frame or information stored in a payload of the Ethernet frame. Therefore, for example, the frame switch 410 may use a destination MAC address, a source MAC address, a VLAN identifier, and priority stored in the Ethernet frame as parameters, and select one of the port identifiers corresponding to the parameters. Such a method of determining a port for outputting the Ethernet frame has been applied to the Ethernet switches on the market. A method of selecting one of a plurality of port identifiers (that is, a method of determining one port among the output ports of the Ethernet frame) is not limited to the above.

In this example, it is assumed that all the physical ports P1 to P5 of the node 100 are available. In this case, in the port management table 461, the port identifiers of the physical ports P1 to P4 are registered so as to be associated with VP1. In Step S4, the frame switch 410 acquires the port identifiers of the physical ports P1 to P4 corresponding to VP1 acquired in Step S9. In Step S6, the frame switch 410 selects one of the port identifiers of the physical ports P1 to P4, and transmits the Ethernet frame from the physical port corresponding to the selected port identifier.

After the Ethernet frame is transmitted in Step S6, or after the Ethernet frame is discarded in Step S11, MAC address learning is performed (Steps S7 and S8). Before describing Steps S7 and S8, the operation of the frame switch searching the FDB 431 using the destination MAC address as a search key to acquire output information in Step S2 (Yes in Step S3) will be described. When the frame switch searches the FDB 431 using the destination MAC address as a search key to acquire output information in Step S2, the process proceeds to Step S4. The processes in Steps S4, S5, S6, and S11 are the same as described above.

In addition, when it is determined in Step S1 that the received Ethernet frame is not a unicast frame, that is, when the received Ethernet frame is a broadcast frame (No in Step S1), the process proceeds to Step S9. After proceeding to Step S9, the processes in Steps S9, S4, S5, S6, and S11 are the same as described above.

As described above, after the Ethernet frame is transmitted in Step S6, or after the Ethernet frame is discarded in Step S11, MAC address learning is performed (Steps S7 and S8). Next, the MAC address learning will be described.

After transmitting the Ethernet frame in Step S6, or after discarding the Ethernet frame in Step S11, the frame switch 410 searches the output port management table 441 stored in the output port management table storage unit 440 of the node, using the port identifier (in this example, P5) of the port receiving the Ethernet frame as a search key, to acquire a port identifier corresponding to the search key (Step S7). The port identifier acquired in Step S7 is to be registered in the FDB 431 as output information. It is assumed that the output port management table 441 shown in FIG. 19 is made. In this case, P5 is acquired as a port identifier corresponding to the search key (in this example, P5).

Subsequent to Step S7, the frame switch 410 registers the source MAC address of the received Ethernet frame as destination information in the FDB 431, and registers the port identifier acquired in Step S7 as output information corresponding to the destination information in the FDB 431 (Step S8).

The operation of the node 100 transferring Ethernet frames from the node 300 to the node 200 or the node 210 has been described above. The operation of the node 100 transferring Ethernet frames from the node 200 or the node 210 to the node 300 is similar to the above.

Next, the failure recovery operation of the general node when a link is disconnected will be described. As an example, the operation of the node 100 when the link between the port P2 of the node 100 and the port P2 of the node 200 (see FIG. 16C) is disconnected will be described below.

When a link connected to the node 100 is disconnected, the port state management unit 490 of the node 100 updates the states of the ports connected to the disconnected link from available to unavailable in the port state management table 501 stored in the port state management table storage unit 500 of the node. When the link connected to the port P2 is disconnected as in this example, the port state management unit 490 updates the state of the port P2 from available to unavailable in the port state management table 501. In addition, the port state management unit 490 updates the port state management table 501, and notifies the LAG management unit 480 of the node that the port state management table 501 has been updated.

The LAG management unit 480 receiving the notification from the port state management unit 490 of the node updates the port management table 461. The update process of the port management table 461 is the same as described above. In this example, the LAG management unit 480 deletes the port identifier of the port P2 from the port management table 461.

In this way, the frame switch 410 of the node 100 does not select the port P2 as a physical port for transmitting the Ethernet frame. That is, when transmitting Ethernet frames from a port belonging to the LAG group including the port P2, the frame switch 410 of the node 100 selects one of the ports P1, P3, and P4 other than the port P2, and transmits the Ethernet frame from the selected port.

Therefore, even when the link between the port P2 of the node 100 and the port P2 of the node 200 is disconnected, the node 100 can continuously communicate with the nodes 200 and 210. Even when another link between the node 100 and the node 200 is disconnected, or even when the link between the node 100 and the node 210 is disconnected, the same process as described above is performed. When any other link is disconnected, the same process as described above is performed.

On the contrary, it is assumed that the link failure between the port P2 of the node 100 and the port P2 of the node 200 is recovered. In this case, the port state management unit 490 of the node 100 updates the state of the ports connected to the recovered link from unavailable to available in the port state management table 501 stored in the port state management table storage unit 500 of the node. As in this example, when the link connected to the port P2 is recovered, the port state management unit 490 updates the state of the port P2 from unavailable to available in the port state management table 501. In addition, the port state management unit 490 updates the port state management table 501 and notifies the LAG management unit 480 of the node that the port state management table 501 has been updated.

The LAG management unit 480 receiving the notification from the port state management unit 490 of the node updates the port management table 461. The update process of the port management table 461 is the same as described above. In this example, the LAG management unit 480 adds the port identifier of the port P2 to the virtual port VP1 allocated to the LAG group including the port P2 in the port management table 461 of the node.

In this way, the frame switch 410 of the node 100 can transmit the Ethernet frame from the port P2 again, and thus the node 100 can return to the state before the link failure occurs.

Next, the failure recovery operation of the general node when a node failure occurs will be described.

Specifically, the failure recovery operation of a general node will be described below with the example that the failure recovery operation of the node 100 when the node 200 shown in FIG. 16C is out of order will be described below.

When the node 200 is out of order, the port state management unit 490 of the node 100 recognizes that both the ports P1 and P2 of the node 100 are changed to a state incapable of transmitting/receiving Ethernet frames. This state is similar to when the link failure occurs except that a plurality of ports are incapable of transmitting/receiving the Ethernet frames. Therefore, the operation of the node 100 is similar to that when the link is disconnected except for the number of ports whose state is updated from available to unavailable in the port state management table 501. As the result of this operation, even when either of the redundant nodes 200 and 210 is out of order, the node 100 can continuously communicate with the other normal node.

In addition, the operation of the node when the node 200 recovers from the failure is the same as that when the link recovers from the failure. That is, when the link recovers from the failure, one port changes its state from unavailable to available. However, when the node 200 recovers from the failure, two ports change their states from unavailable to available in the node 100. As such, the operation of the node 100 (specifically, the operations of the port state management unit 490 and the LAG management unit 480 of the node 100) is similar to the link failure recovery operation except that the number of ports whose state is changed from unavailable to available is increased.

Patent Document 1 (Japanese Unexamined Patent Application Publication No. 2002-232427) discloses a band control apparatus in which some of the physical links trunked to a logic link are grouped to a sub-logic link and the sub-logic link is allocated only for traffic that meets specific conditions. Patent Document 1 also discloses a process of allocating the number of physical links corresponding to the amount of traffic meeting the specific conditions to the sub-logic link.

The general node to which LAG is applied, which is shown in FIG. 17, has the following problems. In the network shown in FIG. 16C, for example, when the link between the port P1 of the node 100 and the port P1 of the node 200 is disconnected, traffic transmitted from the port P1 of the node 100 to the port P1 of the node 200 is transmitted from any one of the ports P2 to P4 of the node 100 to the node 200 or the node 210. In this state, even though the port P2 of the node 100 can communicate with the node 200, the node 100 may transmit the traffic, which has been transmitted from the port P1 of the node 100 to the node 200, from the port P3 or the port P4 of the node 100 to the node 210. When the node 100 transmits the traffic, which has been transmitted from the port P1 of the node 100 to the node 200, to another node even though the port P2 of the node 100 can communicate with the node 200, the following problems arise.

For example, in the network shown in FIG. 16C, it is assumed that the node 200 and the node 210 are redundant Web servers. In this case, a traffic destination node is switched from the node 200 to the node 210, and the node 200 makes an established session unavailable. Therefore, the node 210 may reestablish the session, which results in a waste of the communication band of the network.

Further, for example, in the network shown in FIG. 16O, it is assumed that the node 200 and the node 210 are redundant routers for connecting other networks (not shown) to the node 100. In this case, when an Ethernet frame transferred from the node 100 to a destination node (not shown) through the node 210 reaches the destination node earlier than another Ethernet frame that has been transferred from the node 100 to the destination node through the node 200, the destination node is unlikely to reconfigure data stored in the Ethernet frame.

Furthermore, a network configuration shown in FIG. 25 is also considered as an example of the network configuration. In the network configuration shown in FIG. 25, redundant nodes 110 and 120 configured by a node redundancy technique are provided between the node 100 and the node 200 and between the node 100 and the node 210, respectively. The node 110 and the node 200 are connected to each other by redundant links. Similarly, the node 120 and the node 210 are connected to each other by redundant links. The node 100 is connected to each of the nodes 110 and 120 by one link. In the network configuration shown in FIG. 25, for example, even when one of the links between the node 110 and the node 200 is disconnected, the path of traffic transmitted from the node 100 to the node 200 through the node 110 is not switched to a path from the node 100 to the node 210. That is, it is possible to solve the problem of the traffic communication path being switched due to the disconnection of one link.

However, since the network configuration shown in FIG. 25 is complicated, it requires high costs to construct the network. In addition, in the configuration shown in FIG. 25, since redundant links are not used between the node 100 and the node 110 and between the node 100 and the node 120, the reliability of the network is lowered.

The technique disclosed in Patent Document 1 in which some of the physical links trunked to a logic link are grouped to a sub-logic link, the sub-logic link is allocated only for traffic that meets specific conditions, and the number of physical links corresponding to the amount of traffic meeting the specific conditions is allocated to the sub-logic link cannot solve the problem of the traffic communication path being switched. For example, as shown in FIG. 26, it is assumed that the nodes 100 and 200 are connected to each other by redundant links 171 and 172 and the nodes 100 and 210 are connected to each other by redundant links 173 and 174. In addition, it is assumed that the technique disclosed in Patent Document 1 is applied to the network, the links 171 to 174 are logic links, and the links 171 and 172 are sub-logic links. In this case, when one of the links 171 and 172 is disconnected, either of the links 173 and 174 is allocated to the sub-logic link in order to guarantee the communication band of traffic of the sub-logic link. Then, even though the node 100 can communicate with the node 200, the node 100 transmits traffic to the node 210 and the communication path is switched.

SUMMARY OF THE INVENTION

The invention has been made in an effort to solve the above problems, and an object of the invention is to provide a node, a communication method, and a program for a node capable of solving problems caused by the switching of a traffic communication path due to a link or node failure, and constructing a network with high reliability.

In order to achieve the object, the invention has the following characteristics.

<Node>

According to an aspect of the invention, there is provided a node that is connected to other nodes by a plurality of links. The node includes: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame. The frame destination determining unit specifies physical ports that do not belong to the virtual port, or the virtual port, which is a group of a plurality of physical ports, in correspondence with a destination of the received frame. When specifying the virtual port, the frame destination determining unit determines, as the port for transmitting the frame, the physical port connected to a link that is not out of order, among the physical ports belonging to the specified virtual port.

According to another aspect of the invention, there is provided a node that is connected to other nodes by a plurality of links. The node includes: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame. The frame destination determining unit specifies physical ports that do not belong to any virtual port, the virtual ports, which are groups each including a plurality of physical ports, or the host virtual port, which is a group of a plurality of virtual ports, in correspondence with a destination of the received frame. When specifying the host virtual port, which is a group of a plurality of virtual ports, the frame destination determining unit further specifies the virtual ports belonging to the host virtual port. When specifying the virtual port, which is a group of a plurality of physical ports, the frame destination determining unit determines, as the port for transmitting the frame, the physical port that is connected to a link that is not out of order, among the physical ports belonging to the specified virtual port.

<Communication Method>

According to still another aspect of the invention, there is provided a communication method that is applied to a node that is connected to other nodes by a plurality of links, the node including: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame. The communication method includes: specifying physical ports that do not belong to any virtual port, or the virtual port, which is a group of a plurality of physical ports, in correspondence with a destination of the received frame; and when specifying the virtual port, determining, as the port for transmitting the frame, the physical port connected to a link that is not out of order, among the physical ports belonging to the specified virtual port.

According to yet another aspect of the invention, there is provided a communication method that is applied to a node that is connected to other nodes by a plurality of links, the node including: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame. The communication method includes: specifying physical ports that do not belong to any virtual port, the virtual ports, which are groups each including a plurality of physical ports, or the host virtual port, which is a group of a plurality of virtual ports, in correspondence with a destination of the received frame; when specifying the host virtual port, which is a group of a plurality of virtual ports, further specifying the virtual ports belonging to the host virtual port; and when specifying the virtual port, which is a group of a plurality of physical ports, determining, as the port for transmitting the frame, the physical port that is connected to a link that is not out of order, among the physical ports belonging to the specified virtual port.

<Program for Node>

According to still yet another aspect of the invention, there is provided a program for a node that allows a computer including a node that is connected to other nodes by a plurality of links and includes a first virtual port storage unit that stores a correspondence between a virtual port, which is a group of a plurality of physical ports connected to the links between the nodes, and the physical ports belonging to the virtual port and a second virtual port storage unit that stores a correspondence between a host virtual port, which is a group of a plurality of virtual ports, and the plurality of virtual ports belonging to the host virtual port to execute a frame destination determining process of: specifying physical ports that do not belong to any virtual port, or the virtual port, which is a group of a plurality of physical ports, in correspondence with a destination of a received frame; and when specifying the virtual port, determining, as the port for transmitting the frame, the physical port connected to a link that is not out of order, among the physical ports belonging to the specified virtual port.

According to still yet another aspect of the invention, there is provided a program for a node that allows a computer including a node that is connected to other nodes by a plurality of links and includes a first virtual port storage unit that stores a correspondence between a virtual port, which is a group of a plurality of physical ports connected to the links between the nodes, and the physical ports belonging to the virtual port and a second virtual port storage unit that stores a correspondence between a host virtual port, which is a group of a plurality of virtual ports, and the plurality of virtual ports belonging to the host virtual port to execute a frame destination determining process of: specifying physical ports that do not belong to any virtual port, the virtual ports, which are groups each including a plurality of physical ports, or the host virtual port, which is a group of a plurality of virtual ports, in correspondence with a destination of a received frame; when specifying the host virtual port, which is a group of a plurality of virtual ports, further specifying the virtual ports belonging to the host virtual port; and when specifying the virtual port, which is a group of a plurality of physical ports, determining, as the port for transmitting the frame, the physical port that is connected to a link that is not out of order, among the physical ports belonging to the specified virtual port.

BRIEF DESCRIPTION OF THE DRAWINGS

FIG. 3 is a diagram illustrating an example of an FDB according to the invention.

FIG. 4 is a diagram illustrating an example of a virtual LAG group management table according to the invention.

FIG. 5 is a diagram illustrating an example of a LAG group management table according to the invention.

FIG. 6 is a diagram illustrating an example of a virtual port relationship management table according to the invention.

FIG. 7 is a diagram illustrating an example of an output port management table according to the invention.

FIG. 8 is a diagram illustrating an example of a broadcast frame transmission permission port management table according to the invention.

FIG. 9 is a diagram illustrating an example of a port management table according to the invention.

FIG. 10 is a flowchart illustrating an example of a frame transfer operation of the node according to the invention.

FIG. 12 is a block diagram illustrating an example of the configuration of a node according to a second exemplary embodiment.

FIG. 13 is a diagram illustrating an example of a traffic management table.

FIG. 14 is a diagram illustrating an example of an FDB according to the second exemplary embodiment.

FIG. 15 is a flowchart illustrating a MAC address learning process according to the second exemplary embodiment.

FIG. 18 is a diagram illustrating an example of an FDB of the general node.

FIG. 19 is a diagram illustrating an example of an output port management table of the general node.

FIG. 20 is a diagram illustrating an example of a broadcast frame transmission permission port management table of the general node.

FIG. 21 is a diagram illustrating an example of a port management table of the general node.

FIG. 22 is a diagram illustrating an example of a LAG group management table of the general node.

FIG. 23 is a diagram illustrating an example of a port state management table of the general node.

EXEMPLARY EMBODIMENTS

Hereinafter, exemplary embodiments of the invention will be described with reference to the accompanying drawings.

First Exemplary Embodiment

Figure 1:
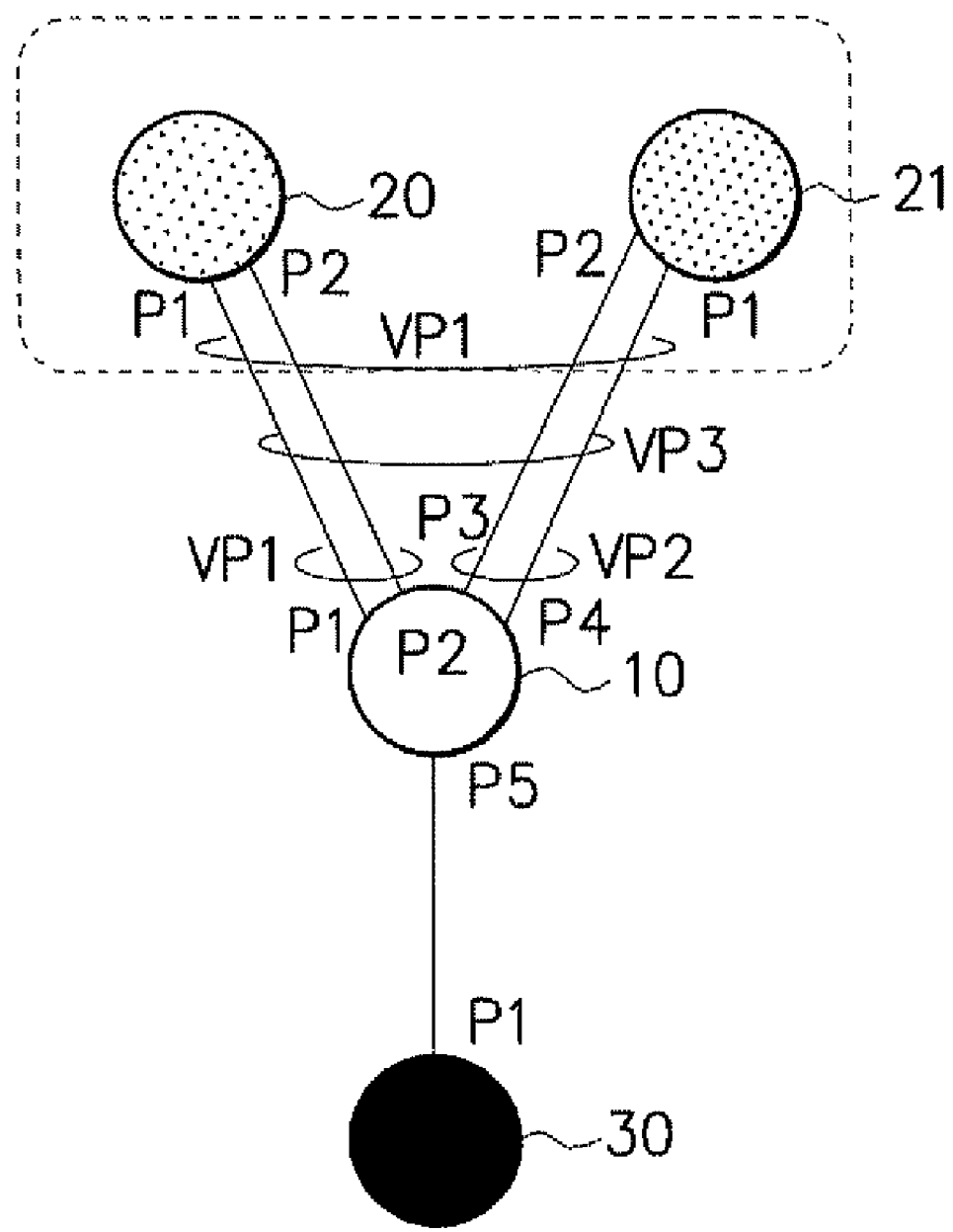
FIG. 1 is a diagram illustrating an example of the configuration of a network including a node according to the invention.

FIG. 1 is a diagram illustrating an example of the configuration of a network including a node according to a first exemplary embodiment of the invention. A node 10 according to the invention is connected to other nodes 20, 21, and 30. The nodes 20 and 21 are redundantly configured. A port P5 of the node 10 is connected to a port P1 of the node 30 by one physical link. A port P1 of the node 10 is connected to a port P1 of the node 20 by one physical link, and a port P2 of the node 10 is connected to a port P2 of the node 20 by one physical link. In addition, a port P3 of the node 10 is connected to a port P2 of the node 21 by one physical link, and a port P4 of the node 10 is connected to a port P1 of the node 21 by one physical link.

In the configuration of the network shown in FIG. 1, a LAG group (or virtual port) is set in the node 10 according to the invention as follows. The ports P1 and P2 of the node 10 according to the invention are registered in the same LAG group, and a port identifier VP1 of a virtual port is allocated to the LAG group. In addition, the ports P3 and P4 of the node 10 according to the invention are registered in the same LAG group, and a port identifier VP2 of a virtual port is allocated to the LAG group. Further, the virtual ports VP1 and VP2 of the node 10 are registered in the same virtual LAG group, and a port identifier VP3 of a virtual port is allocated to the virtual LAG group. The term "virtual LAG group" means a group of virtual ports. A port identifier of a virtual port is also allocated to the virtual LAG group.

Figure 17:
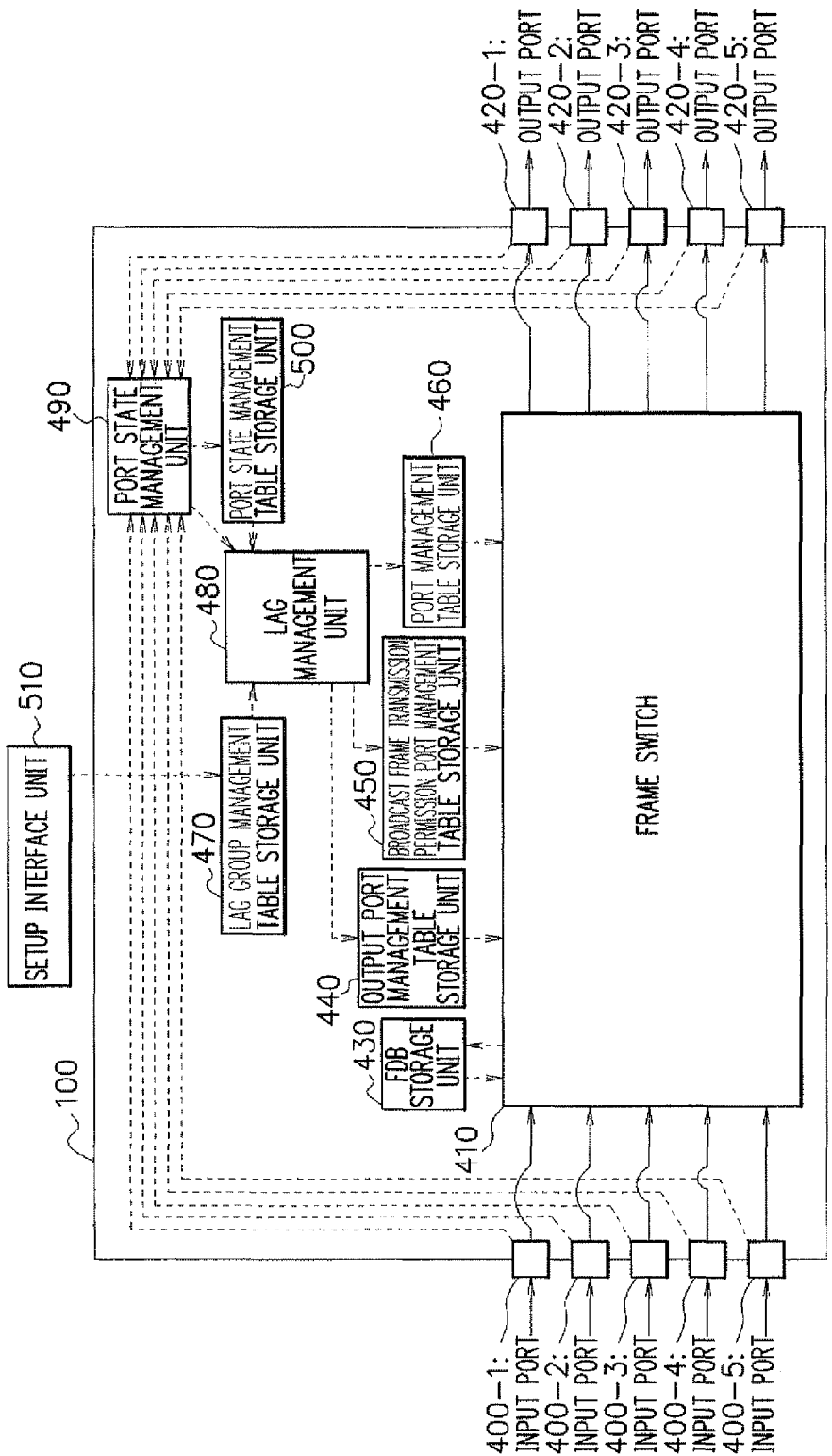
FIG. 17 is a block diagram illustrating the configuration of a general node.

The present invention differs from a general node shown in FIG. 17 in that a virtual LAG group, which is a virtual port group, is set and a port identifier of a virtual port is allocated to the virtual LAG group. That is, in the general node shown in FIG. 17, a plurality of physical ports are virtualized to one physical port. However, in the present invention, a plurality of virtual ports are virtualized to one physical port. The registration of the virtual port in the virtual LAG group and the allocation of the port identifier of the virtual port to the virtual LAG group are performed by registering the port identifier of the virtual port in a virtual LAG group management table 521, which will be described below. The virtual LAG group management table 521 also will be described below.

As such, the node 10 is connected to a plurality of other nodes (nodes 20 and 21) virtualized to one node by a plurality of links. A group (LAG group) of physical ports connected to the nodes (nodes 20 and 21) virtualized to one node by the corresponding links is defined as one virtual port. In addition, a group including a plurality of virtual ports (virtual LAG group) is defined as one virtual port. In this embodiment, the virtual LAG group is a group of virtual ports that are set in a plurality of other nodes that are virtualized to one node. For example, in the node 10, the virtual port VP1 for the node 20 and the virtual port VP2 for the node 21 belong to a virtual LAG group, and the virtual LAG group including the virtual ports VP1 and VP2 is referred to as one virtual port.

However, the node 10 is not connected to other virtualized nodes, but the node 10 may be connected to one physical node by a plurality of links. A group (LAG group) of physical ports of the node 10 connected to the links may be defined as a virtual port, and a group of the virtual ports (virtual LAG group) may be defined as one virtual port.

Further, when the node 10 is connected to a plurality of other virtualized nodes (nodes 20 and 21) by a plurality of links, a plurality of groups of physical ports, not one group (LAG group) of physical ports, may be connected to another node by links. For example, the node 10 shown in FIG. 1 may be connected to the node 20 by four links, and it may be connected to the node 21 by two links. In this case, among the four physical ports of the node 10 connected to the node by the links, a group (LAG group) of two physical ports may be defined as one virtual link, and a group of the other two physical ports may be defined as another virtual link. In addition, a group of the two virtual links (virtual LAG group) may be defined as one virtual port.

In the following description, as shown in FIG. 1, the node 10 is connected to a plurality of other nodes (nodes 20 and 21), which are virtualized to one node, by a plurality of links, and a group (LAG group) of physical ports connected to each of the nodes (nodes 20 and 21), which are virtualized to one node, by the links between the nodes is defined as one virtual port. Further, in the following description, the virtual port VP1 for the node 20 and the virtual port VP2 for the node 21 belong to a virtual LAG group, and the virtual LAG group including the virtual ports VP1 and VP2 is defined as one virtual port.

In the following description, the node 10 means a node according to the invention, not a general node.

Figure 2:
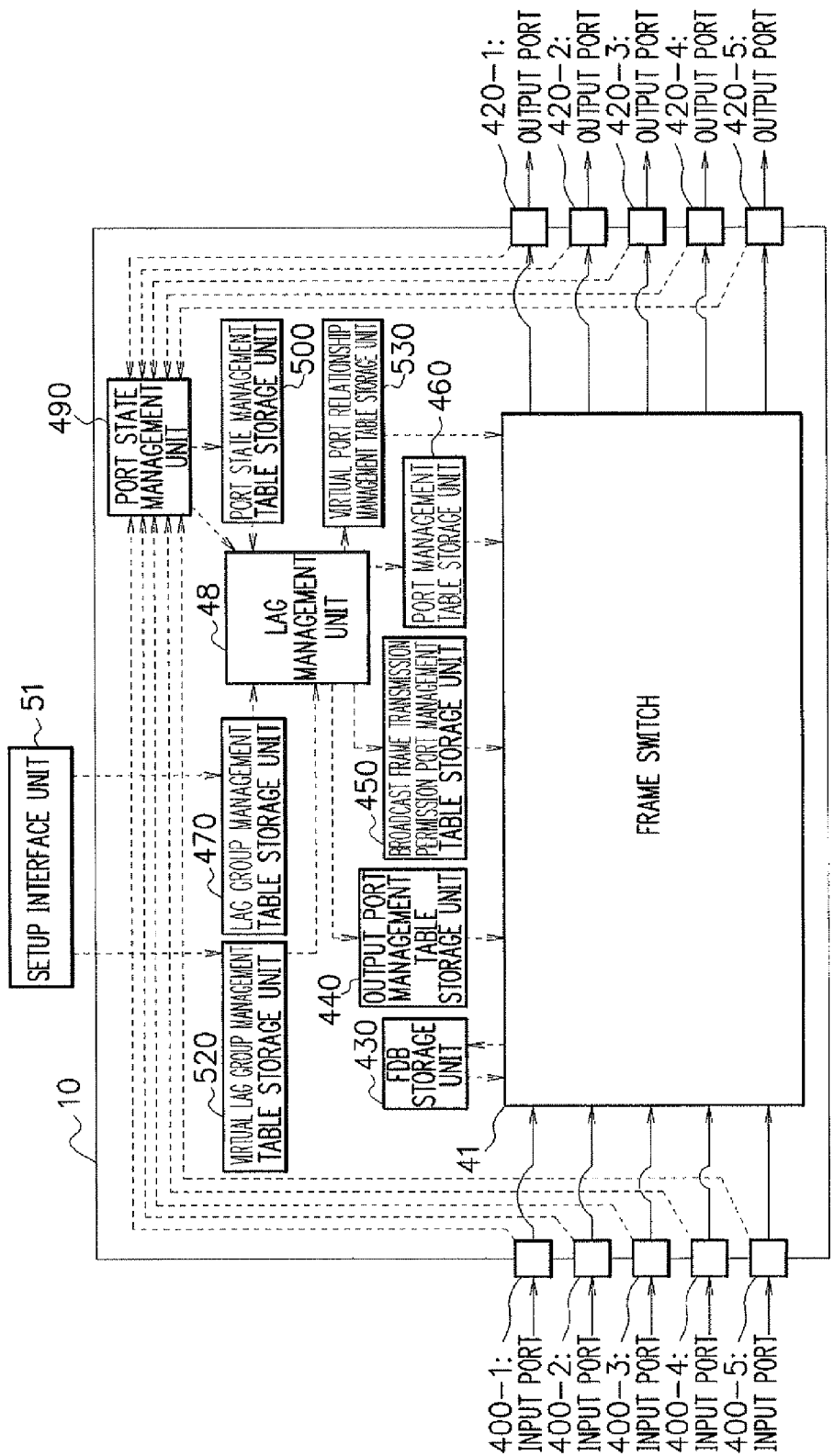
FIG. 2 is a block diagram illustrating an example of the configuration of the node according to the invention.

FIG. 2 is a block diagram illustrating an example of the configuration of the node 10 according to the first exemplary embodiment of the invention. In FIG. 2, the same components as those of the general node shown in FIG. 17 are denoted by the same reference numerals. The node 10 according to the invention includes input ports 400-1 to 400-5, a frame switch 41, output ports 420-1 to 420-5, an FDB storage unit 430, an output port management table storage unit 440, a broadcast frame transmission permission port management table storage unit 450, a port management table storage unit 460, a LAG group management table storage unit 470, a LAG management unit 48, a port state management unit 490, a port state management table storage unit 500, a setup interface unit 51, a virtual LAG group management table storage unit 520, and a virtual port relationship management table storage unit 530.

The input ports 400-1 to 400-5 of the node 10 are receiver-side ports in the ports P1 to P5 of the node 10 shown in FIG. 1. That is, the input ports 400-1 to 400-5 of the node 10 receives Ethernet frames transmitted from the adjacent nodes 20, 21, or 30. Specifically, the input port 400-1 of the node 10 receives Ethernet frames transmitted from the port P1 of the node 20. The input port 400-2 of the node 10 receives Ethernet frames transmitted from the port P2 of the node 20. The input port 400-3 of the node 10 receives Ethernet frames transmitted from the port P1 of the node 21. The input port 400-4 of the node 10 receives Ethernet frames transmitted from the port P2 of the node 21. The input port 400-5 of the node 10 receives Ethernet frames transmitted from the port P1 of the node 30.

Similarly, the output port 420-1 to 420-5 of the node 10 of the invention are transmitter-side ports in the ports P1 to P5 of the node 10 shown in FIG. 1. That is, the output ports 420-1 to 420-5 transmit Ethernet frames to the adjacent nodes 20, 21, and 30. Specifically, the output port 420-1 of the node 10 transmits Ethernet frames to the port P1 of the node 20. The output port 420-2 of the node 10 transmits Ethernet frames to the port P2 of the node 20. The output port 420-3 of the node 10 transmits Ethernet frames to the port P1 of the node 21. The output port 420-4 of the node 10 transmits Ethernet frames to the port P2 of the node 21. The output port 420-5 of the node 10 transmits Ethernet frames to the port P1 of the node 30.

The frame switch 41 of the node 10 determines an output port that transmits the received Ethernet frames, on the basis of the content of the Ethernet frames received from other nodes, and information registered in databases stored in the FDB storage unit 430, the broadcast frame transmission permission port management table storage unit 450, the port management table storage unit 460, and the virtual port relationship management table storage unit 530, and then transmits the Ethernet frames from the determined output port.

The FDB storage unit 430 of the node 10 is a storage device that stores an FDB (Forwarding DataBase). The FDB stored in the FDB storage unit 430 of the node 10 according to the invention is the same as that stored in an FDB storage unit 430 of a general node 100 shown in FIG. 17. That is, the FDB stored in the node according to this embodiment is a database that registers destination information and output information of an Ethernet frame (the port identifier of the port transmitting the Ethernet frame) such that they are associated with each other. For example, an FDB 431 shown in FIG. 3 is stored in the FDB storage unit 430 by MAC address learning. The MAC address learning performed by the frame switch 41 is the same as that performed by a general node. However, in the node 10, physical ports connected to the same node are registered in a LAG group, and a virtual port allocated to the LAG group is registered in the virtual LAG group. In addition, the virtual ports connected to the redundant nodes 20 and 21 are registered in the same virtual LAG group. As a result, different information items are output to the redundant nodes 20 and 21.

In this embodiment, the port identifiers of physical ports or the port identifier of the virtual port allocated to the LAG group are stored in an output information field of the FDB 431.

The output port management table storage unit 440 of the node 10 is a storage device that stores an output port management table. The output port management table stored in the output port management table storage unit 440 of the node 10 is the same as that stored in an output port management table storage unit 440 of the general node 100 shown in FIG. 17. That is, the output port management table stored in the node according to the invention is a database in which the physical ports P1 to P5 of the node are associated with output information items. The output port management table shows output information to be registered in the FDB 431 when MAC address learning is performed on the basis of the Ethernet frames received from the physical ports P1 to P5 provided in the node. Similar to the general node shown in FIG. 17, the port identifiers of the physical ports provided in the node are registered as initial values of the output port management table.

The broadcast frame transmission permission port management table storage unit 450 of the node 10 is a storage device that stores a broadcast frame transmission permission port management table. The broadcast frame transmission permission port management table is the same as that stored in a broadcast frame transmission permission port management table storage unit 450 of the general node 100 shown in 17. That is, the broadcast frame transmission permission port management table stored in the node according to the invention is a database in which the physical ports of the node are associated with all the ports that permit the transmission of the broadcast frames received by each of the physical ports of the node.

The port management table storage unit 460 of the node 10 is a storage device that stores a port management table. The port management table stored in the port management table storage unit 460 of the node 10 is the same as that stored in a port management table storage unit 460 of the general node 100 shown in FIG. 17. That is, the port management table stored in the node according to the invention is a database in which the port identifiers of the physical ports that can transmit or receive Ethernet frames are registered in the virtual ports allocated to the LAG groups of the node and the physical ports that do not belong to any LAG group.

The LAG group management table storage unit 470 of the node 10 is a storage device that stores a LAG group management table. The LAG group management table stored in the LAG group management table storage unit 470 of the node 10 is the same as that stored in a LAG group management table storage unit 470 of the general node 100 shown in FIG. 17. That is, the LAG group management table stored in the node 10 according to the invention is a database in which the port identifiers of the virtual ports allocated to the LAG groups set in the node are associated with the physical ports belonging to the LAG groups. For example, the group identifier of the LAG group, the port identifier of the virtual port allocated to the LAG group, and the port identifiers of the physical ports belonging to the LAG group are registered in the LAG group management table such that they are associated with each other. In this way, a plurality of physical ports are classified into one LAG group.

Similar to the general node shown in FIG. 17, the port identifier of the virtual port allocated to the LAG group may be different from the port identifier of the virtual port allocated to another LAG group set in the node and the port identifiers of the physical ports provided in the node. In addition, the same physical port cannot be registered in a plurality of LAG groups.

The port state management table storage unit 500 of the node 10 is a storage device that stores a port state management table. The port state management table stored in the port state management table storage unit 500 of the node 10 is the same as that stored in a port state management table storage unit 500 of the general node 100 shown in FIG. 17.

The operation of the port state management unit 490 of the node 10 is the same as that of a port state management unit 490 of the general node 100 shown in FIG. 17. That is, the port state management unit 490 of the node 10 determines whether each of the ports P1 to P5 of the node is available or unavailable, and registers the determination result in the port state management table stored in the port state management table storage unit 500 of the node.

For example, the port state management unit 490 of the node 10 monitors the electric signal level or the optical signal level of the links connected to an input port and an output port of each of the port. When the electric signal level or the optical signal level of either the input port or the output port of the port is lower than a predetermined threshold value, the port state management unit 490 may determine that the port is unavailable, and when it is higher than the predetermined threshold value, the port state management unit 490 may determine that the port is available. However, the method of the port state management unit 490 of the node 10 determining the state of the port is not limited thereto. For example, when there is a port that does not continuously receive a packet that may be transmitted at a predetermined time interval from an adjacent node for a predetermined time, the port state management unit 490 may determine that the port is unavailable.

The virtual LAG group management table storage unit 520 of the node 10 is a storage device that stores a virtual LAG group management table. The virtual LAG group management table is a database in which the port identifier of the virtual port allocated to the virtual LAG group set in the node (in this embodiment, the node 10) is associated with the port identifiers of the virtual ports belonging to the virtual LAG group. For example, in the database, the group identifier of the virtual LAG group set in the node, the port identifier of the virtual port allocated to the virtual LAG group, and the port identifiers of the virtual ports belonging to the virtual LAG group are associated with each other.

An administrator of the node 10 sets the virtual LAG group management table using the setup interface unit 51. In addition, the LAG management unit 48 of the node refers to the virtual LAG group management table.

FIG. 4 is a diagram illustrating an example of the virtual LAG group management table stored in the virtual LAG group management table storage unit 520 of the node 10. As shown in FIG. 4, the group identifier of a virtual LAG group, the port identifier of the virtual port allocated to the virtual LAG group, and the port identifiers of one or more virtual ports belonging to the virtual LAG group are registered such that they are associated with each other in a virtual LAG group management table 521 stored in the virtual LAG group management table storage unit 520. A first entry of the virtual LAG group management table 521 shown in FIG. 4 means that a port identifier VP3 of a virtual port is allocated to a virtual LAG group VLG1 and virtual ports VP1 and VP2 are registered in the virtual LAG group. In addition, the LAG group management table stored in the LAG group management table storage unit 470 is set as shown in FIG. 5.

That is, the port identifier VP1 of a virtual port is allocated to a LAG group LG1, and the physical ports P1 and P2 are registered in the LAG group. In addition, the port identifier VP2 of a virtual port is allocated to a LAG group LG2, and the physical ports P3 and P4 are registered in the LAG group. In this case, the physical ports P1 and P2 belong to the virtual port VP1, and the physical ports P3 and P4 belong to the virtual port VP2. As shown in FIG. 4, since the virtual ports VP1 and VP2 belong to the virtual port VP3, the physical ports P1 to P4 belong to the virtual port VP3.

The port identifier of the virtual port allocated to the virtual LAG group and the port identifiers of one or more virtual ports belonging to the virtual LAG group are registered in the virtual LAG group management table 521 so as to be associated with the group identifier of the virtual LAG group. In this way, the registration of the virtual port in the virtual LAG group and the allocation of the port identifier of the virtual port to the virtual LAG group are performed.

Unlike the general node shown in FIG. 17, in the present invention, since the virtual LAG group management table 521 is used, a plurality of virtual ports can be virtualized to one physical port.

Similar to the general node shown in FIG. 17, it is possible to determine whether the port identifier is of the physical port or the virtual port.

Further, the port identifier of the virtual port allocated to the virtual LAG group may not be identical with the port identifier of another virtual port set in the node. In addition, one virtual port cannot belong to a plurality of virtual LAG groups.

Furthermore, the virtual port that is allocated to the LAG group registered in the LAG group management table of the node, or the virtual port that is allocated to the virtual LAG group registered in the virtual LAG group management table of the node can belong to the virtual LAG group.

The virtual LAG group is related to the physical ports provided in the node 10 through the virtual ports belonging to the virtual LAG group, such as the physical ports belonging to the virtual ports included in the virtual LAG group, or the physical ports belonging to the virtual ports that belong to the host virtual ports included in the virtual LAG group. In this case, the physical ports belongs to the virtual LAG group that is related to the virtual port including the physical port, or the virtual port allocated to the virtual LAG group. In contrast, the virtual LAG group includes the physical ports related thereto through the virtual ports belonging to the virtual LAG group.

Only the difference between the LAG group and the virtual LAG group is whether they include the physical ports or the virtual ports, and thus the LAG group and the virtual LAG group are essentially the same in concept. Therefore, the LAG group management table 471 (see FIG. 5) stored in the LAG group management table storage unit 470 and the virtual LAG group management table 521 (see FIG. 4) stored in the virtual LAG group management table storage unit 520 may be integrated into one database. That is, in FIG. 2, the LAG group management table storage unit 470 is separately provided from the virtual LAG group management table storage unit 520, but they are the same storage devices. A database obtained by integrating the LAG group management table 471 (see FIG. 5) and the virtual LAG group management table 521 (see FIG. 4) may be stored in the storage device.

The virtual port relationship management table storage unit 530 of the node 10 is a storage device that stores a virtual port relationship management table. The virtual port relationship management table is a database that manages the virtual LAG group including the virtual ports. Specifically, in the database, individual virtual ports set in the node are associated with the virtual port allocated to the virtual LAG group including the individual virtual ports. For example, the port identifiers of the individual virtual ports set in the node and the port identifier of the virtual port allocated to the virtual LAG group including the individual virtual ports are registered in the virtual port relationship management table such that they are associated with each other. The virtual ports set in the node include the virtual port allocated to the virtual LAG group as well as the virtual port allocated to the LAG group.

The virtual port relationship management table is updated by the LAG management unit 48 of the nodes and is referred to by the frame switch 41 of the node.

FIG. 6 is a diagram illustrating an example of the virtual port relationship management table stored in the virtual port relationship management table storage unit 530 of the node 10. The port identifier of each of the virtual ports set in the node and the port identifier of the virtual port allocated to the virtual LAG group including the virtual ports are registered such that they are associated with each other in a virtual port relationship management table 531 stored in the virtual port relationship management table storage unit 530. For example, a first entry of the virtual port relationship management table 531 shown in FIG. 6 means that a virtual port VP1 belongs to a virtual LAG group VLG1 corresponding to a virtual port VP3. In addition, when a virtual port does not belong to any virtual LAG group, a value indicating that the virtual port does not belong to any virtual LAG group (in this embodiment, a NULL value) is registered so as to be associated with the port identifier of the virtual port. For example, a third entry of the virtual port relationship management table 531 shown in FIG. 6 means that the virtual port VP3 does not belong to any virtual LAG group.

The setup interface unit 51 is a user interface that allows the node administrator to update the LAG group management table and the virtual LAG group management table (registration or modification of data), and is implemented as an input device, such as a keyboard. The setup interface unit 51 is operated by the administrator and updates the LAG group management table and the virtual LAG group management table in response to instructions from the administrator. That is, the setup interface unit 51 allows the administrator to register data in the LAG group management table and the virtual LAG group management table.

The LAG management unit 48 of the node 10 updates the output port management table, the broadcast frame transmission permission port management table, the port management table, and the virtual port relationship management table.

Next, the operation of the node 10 according to the invention will be described.

First, the operation of the LAG management unit 48 of the node 10 will be described. It is assumed that the administrator of the node 10 has used the setup interface unit 51 to update the LAG group management table 471 (see FIG. 5) or the virtual LAG group management table 521 (see FIG. 4) of the node. Then, the LAG management unit 48 updates the output port management table, the broadcast frame transmission permission port management table, the port management table, and the virtual port relationship management table 531, on the basis of the content set in the LAG group management table 471 stored in the LAG group management table storage unit 470 and the virtual LAG group management table 521 stored in the virtual LAG group management table storage unit 520 of the node.

In the following description, the operation of the LAG management unit 48 of the node 10 will be described under the following conditions: in the network shown in FIG. 1, the port state management table of the node 10 is set as shown in FIG. 23; the LAG group management table 471 of the node 10 is set as shown in FIG. 5; and the virtual LAG group management table 521 of the node 10 is set as shown in FIG. 4.

The operation of the LAG management unit 48 of the node 10 setting the output port management table stored in the output port management table storage unit 440 is the same as that of a LAG management unit 480 of the general node 100, shown in FIG. 17, setting the output port management table. That is, when the port identifiers of the physical ports of the node are registered in the LAG group management table 471 such that they are associated with the LAG group identifier and the port identifier of the virtual port allocated to the LAG group, the LAG management unit 48 registers the port identifiers of the physical ports and the port identifier of the virtual port allocated to the LAG group in the output port management table such that they are associated with each other. In addition, the LAG management unit 48 registers, in the output port management table, the port identifiers of the physical ports that do not belong to any LAG group among the physical ports of the node such that they are associated with their own port identifiers.

FIG. 7 is a diagram illustrating an example of the output port management table set as described above. As shown in FIG. 5, in the LAG group management table 471, the port identifiers P1 and P2 of the physical ports are associated with the port identifier VP1 of the virtual port. Therefore, the LAG management unit 48 registers the port identifier VP1 of the virtual port that is associated with the port identifier P1 of the physical port, as in the output port management table 441 shown in FIG. 7. This is similarly applied to the port identifier P2 of the physical port. In addition, in the LAG group management table 471, the port identifiers P3 and P4 of the physical ports are associated with the port identifier VP2 of the virtual port (see FIG. 5). Therefore, the LAG management unit 48 registers the port identifier VP2 of the virtual port that is associated with the port identifier P3 of the physical port, as in the output port management table 441 shown in FIG. 7. This is similarly applied to the port identifier P4 of the physical port.

Since the physical port P5 is not registered in the LAG group management table 471, the LAG management unit 48 registers the port identifier P5 of the physical port in the output port management table 441 such that it is associated with its own port identifier P5 (see FIG. 7).

Next, the operation of the LAG management unit 48 of the node 10 setting the broadcast frame transmission permission port management table stored in the broadcast frame transmission permission port management table storage unit 450 will be described. FIG. 8 is a diagram illustrating an example of the broadcast frame transmission permission port management table 451 set by the LAG management unit 48.

As will be described below, the LAG management unit 48 registers, in the broadcast frame transmission permission port management table 451, the port identifiers of the physical ports of the node, the port identifier of the virtual port, or both the port identifiers of the physical ports and the port identifier of the virtual port, as a port identifier of a broadcast frame transmission permission port (a port that permits the transmission of a broadcast frame), for each of the port identifiers of the physical ports provided in the node.

The LAG management unit 48 determines whether each of the physical ports provided in the node belongs to any LAG group provided in the node with reference to the LAG group management table 471. When the port identifier of the physical port is registered in the LAG group management table 471 in association with the port identifier of any virtual port, the LAG management unit 48 determines that the physical port belongs to any LAG group set in the node. In the LAG group management table 471, when the port identifier of the physical port is associated with no port identifier of the virtual port, the LAG management unit 48 determines that the physical port does not belong to any LAG group set in the node.

The operation of the LAG management unit 48 setting the broadcast frame transmission permission port management table 451 depends on whether the physical port belongs to any LAG group set in the node or it does not belong to any LAG group set in the node.

When the port identifier of the physical port (hereinafter, referred to as a physical port T) that belongs to any LAG group set in the node and the port identifier of the broadcast frame transmission permission port are registered such that they are associated with each other, the LAG management unit 48 operates as follows. When there is a virtual port satisfying a first condition, the LAG management unit 48 registers the port identifier of the physical port T and the port identifiers of all the virtual ports satisfying the first condition in the broadcast frame transmission permission port management table 451 such that they are associated with each other. The first condition is that a virtual port is set in the node, does not include the physical port T, and does not belong to any virtual LAG group. The virtual port satisfying the first condition serves as a virtual port that is the transmission permission port of the broadcast frame received by the physical port T. That is, when the port identifier of the virtual port that is not associated with the port identifier of the physical port T exists in the LAG group management table 471 and the port identifier of the virtual port that is not associated with any port identifier of the virtual port allocated to the virtual LAG group exists in the virtual LAG group management table 521, the LAG management unit 48 registers the port identifier of the physical port T and the port identifier of the virtual port such that they are associated with each other. In addition, when there is a physical port satisfying a second condition, the LAG management unit 48 registers the port identifier of the physical port T and the port identifiers of all the physical ports satisfying the second condition in the broadcast frame transmission permission port management table 451 such that they are associated with each other. The second condition is that there is a physical port that does not belong to any LAG group set in the node. The virtual port satisfying the second condition serves as a virtual port that is the transmission permission port of the broadcast frame received by the physical port T. That is, among the port identifiers of the physical ports of the node, when the port identifier of the physical port that is not associated with any port identifier of the virtual port allocated to the LAG group exists in the LAG group management table 471, the LAG management unit 48 registers the port identifier of the physical port T and the port identifier of the physical port such that they are associated with each other.

When the port identifier of a physical port (hereinafter, referred to as a physical port S) that does not belong to any LAG group set in the node and the port identifier of the broadcast frame transmission permission port are registered so as to be associated with each other, the LAG management unit 48 operates as follows. When there is a virtual port satisfying a third condition, the LAG management unit 48 registers the port identifier of the physical port S and the port identifiers of all the virtual ports satisfying the third condition in the broadcast frame transmission permission port management table 451 such that they are associated with each other. The third condition is that a virtual port is set in the node and does not belong to any virtual LAG group. The virtual port satisfying the third condition serves as a virtual port that is the transmission permission port of the broadcast frame received by the physical port S. That is, among the port identifiers of the virtual ports registered in the LAG group management table 471, when the port identifier of the virtual port that is not associated with any port identifier of the virtual port allocated to the virtual LAG group exists in the virtual LAG group management table 521, the LAG management unit 48 registers the port identifier of the physical port S and the port identifier of the virtual port such that they are associated with each other. In addition, when there is a physical port satisfying a fourth condition, the LAG management unit 48 registers the port identifier of the physical port S and the port identifiers of all the physical ports satisfying the fourth condition in the broadcast frame transmission permission port management table 451 such that they are associated with each other. The fourth condition is that a physical port does not belong to any LAG group set in the node and is other than the physical port S. The virtual port satisfying the fourth condition serves as a virtual port that is the transmission permission port of the broadcast frame received by the physical port T. That is, among the port identifiers of the physical ports of the node, when the port identifiers of the physical ports other than the physical port S that is not associated with any port identifier of the virtual port allocated to the LAG group exists in the LAG group management table 471, the LAG management unit 48 registers the port identifier of the physical port S and the port identifiers of the physical ports such that they are associated with each other.

When the LAG group management table 471 is updated as shown in FIG. 5 and the virtual LAG group management table 521 is updated as shown in FIG. 4 by the above-mentioned operation of the above LAG management unit 48, the broadcast frame transmission permission port management table 451 stored in the broadcast frame transmission permission port management table storage unit 450 is as shown in FIG. 8.

For example, as shown in FIG. 5, the physical port P1 belongs to the LAG group LG1. For the physical port P1, there is no physical port satisfying the first condition (a virtual port that is set in the node, does not include the physical port P1, and does not belong to any virtual LAG group). In addition, the physical port P5 (a physical port that does not belong to any LAG group set in the node) satisfies the second condition. Therefore, the LAG management unit 48 registers P1 and P5 so as to be associated with each other (see FIG. 8). The LAG management unit 48 registers the physical ports P1 to P4 by the same method as above. The physical port P5 does not belong to any LAG group set in the node. The virtual port VP3 allocated to the virtual LAG group (a virtual port that is set in the node and does not belong to any virtual LAG group) satisfies the third condition. The physical port P5 does not satisfy the fourth condition (a physical port is other than the physical port P5, and does not belong to any LAG group set in the node). Therefore, the LAG management unit 48 registers P5 and VP3 so as to be associated with each other (see FIG. 8). In this way, the broadcast frame transmission permission port management table 451 shown in FIG. 8 is made.

The broadcast frame transmission permission port management table 451 is made as described above. The frame switch 41 receives a broadcast frame and performs Step S9 shown in FIG. 10, which will be described below. In this case, when a physical port receiving the broadcast frame belongs to any virtual port, which is a group of a plurality of physical ports, the frame switch 41 selects a virtual port that is set in the node, does not include the physical port receiving the broadcast frame, and does not belong to any virtual port, which is a group of a plurality of virtual ports, and a physical port that does not belong to any virtual port, which is a group of a plurality of physical ports. In addition, when the physical port receiving the broadcast frame does not belong to any virtual port, which is a group of a plurality of physical ports, the frame switch 41 selects a virtual port that is set in the node and does not belong to any virtual port, which is a group of a plurality of virtual ports, and a physical port other than the physical port receiving the broadcast frame among the physical ports that do not belong to any virtual port, which is a group of a plurality of physical ports.

Next, the operation of the LAG management unit 48 of the node 10 setting the port management table stored in the port management table storage unit 460 of the node will be described. FIG. 9 is a diagram illustrating an example of the port management table 461 set by the LAG management unit 48. First, the LAG management unit 48 of the node 10 searches the port identifiers of the virtual ports allocated to each of the LAG groups set in the LAG group management table 471, with reference to the LAG group management table 471 stored in the LAG group management table storage unit 470. Then, the LAG management unit 48 determines whether one or more physical ports (physical ports belonging to the LAG group) associated with each of the searched port identifiers of the virtual ports are available or unavailable, with reference to the port state management table 501 stored in the port state management table storage unit 500. Then, the LAG management unit 48 selects the port identifiers of all the physical ports that are determined to be available. The LAG management unit 48 registers the port identifiers of the virtual ports searched from the LAG group management table 471, and the port identifies of all the physical ports that are determined to be available among the physical ports corresponding to the searched port identifiers in the port management table 461 such that they are associated with each other. In this case, when the port identifiers of the physical ports that are associated with the port identifiers of the searched virtual ports and determined as to be unavailable are registered in the port management table 461, the LAG management unit 48 deletes the port identifiers of the physical ports that are determined to be unavailable from the port management table 461. When it is determined whether the physical ports are available or unavailable for the port identifier of each of the virtual ports and there is no physical port that is determined to be available, the LAG management unit 48 registers the port identifiers of the virtual ports and a value (NULL value) indicating that there is no physical port that can transmit or receive data in the port management table 461 such that they are associated with each other. This operation is the same as that of the LAG management unit 480 of the general node 100, shown in FIG. 17, setting the port management table 461.

However, the LAG management unit 48 of the node 10 further performs the following operation. The LAG management unit 48 refers to the virtual LAG management table 521 stored in the virtual LAG management table storage unit 520, the LAG group management table 471, and the port state management table 501. Then, the LAG management unit 48 registers the port identifier of the virtual port including the physical ports in an available state, among the virtual ports belonging to the virtual LAG group, in the port management table 461 so as to be associated with the port identifier of the virtual port allocated to each virtual LAG group. Specifically, the LAG management unit 48 performs the following operation for each virtual LAG group. The LAG management unit 48 reads the port identifier of the virtual port allocated to the virtual LAG group and the port identifier of each virtual port belonging to the virtual LAG group, with reference to the virtual LAG management table 521. Then, the LAG management unit 48 reads out the port identifiers of the physical ports associated with the port identifier of each virtual port belonging to the virtual LAG group, with reference to the LAG group management table 471. Then, the LAG management unit 48 determines whether the physical ports are available or unavailable with reference to the port state management table 501. Subsequently, the LAG management unit 48 determines whether, among the port identifiers of the physical ports associated to the port identifier of the virtual port, the port identifiers of available physical ports are included in each virtual port belong to the virtual LAG group.

The LAG management unit 48 registers, in the port management table 461, among the port identifiers of the virtual ports belonging to the virtual LAG group, only the port identifier of the virtual port including the port identifiers of available physical ports among the port identifiers of the physical ports associated with the virtual ports, so as to be associated with the port identifier of the virtual port allocated to the virtual LAG group. Therefore, the port identifier of the virtual port, which does not include the port identifiers of available physical ports among the port identifiers of the physical ports associated with the virtual ports, is deleted. When there is no virtual port including an available physical port among the virtual ports belonging to the virtual LAG group, the LAG management unit 48 registers the port identifier of the virtual port allocated to the virtual LAG group and a NULL value in the port management table 461 such that they are associated with each other. That is, when there is no port identifier of an available physical port among the port identifiers of the physical ports corresponding to the port identifiers of all the virtual ports belonging to the virtual LAG group, the LAG management unit 48 registers the port identifier of the virtual port allocated to the virtual LAG group and a NULL value in the port management table such that they are associated with each other.

When the port state management table of the node is set as shown in FIG. 23, the LAG group management table 471 is updated as shown in FIG. 5, and the virtual LAG group management table 521 is updated as shown in FIG. 4 by the above-mentioned operation of the LAG management unit 48, the port management table 461 stored in the port management table storage unit 460 is made as shown in FIG. 9.

The LAG management unit 48 updates the port management table 461 of the node when it is informed from the port state management unit 490 of the node that the port state management table 501 of the node has been updated as well as when the LAG group management table 471 or the virtual LAG group management table 521 of the node is updated. In addition, the LAG management unit 48 may check whether the port state management table 501 stored in the port state management table storage unit 500 of the node is updated at a predetermined time interval. When it is checked that the port state management table is updated, LAG management unit 48 may update the port management table 461.

Next, the operation of the LAG management unit 48 of the node 10 setting the virtual port relationship management table 531 stored in the virtual port relationship management table storage unit 530 of the node will be described.

The LAG management unit 48 refers to the LAG group management table 471 and the virtual LAG group management table 521 to register the port identifier of the virtual port allocated to the virtual LAG group including the virtual ports in the virtual port relationship management table 531 so as to be associated with the port identifiers of all the virtual ports set in the node.

The port identifiers of the virtual ports set in the node mean the port identifiers of the virtual ports allocated to the LAG groups in the LAG group management table 471 and the port identifier of the virtual port allocated to the virtual LAG group in the virtual LAG group management table 521. The LAG management unit 48 searches, from the virtual LAG group management table 521, the port identifier of the virtual port allocated to the virtual LAG group including the virtual ports indicated by these port identifiers (which are referred to as port identifiers U), and registers the port identifiers U of the virtual ports and the port identifier of the virtual port allocated to the virtual LAG group including the virtual ports in the virtual port relationship management table 531 such that they are associated with each other. When the LAG management unit 48 fails to search the port identifier of the virtual port allocated to the virtual LAG group including the virtual ports indicated by the port identifiers U, the LAG management unit 48 registers the port identifiers U and a value (NULL value) indicating that the virtual port does not belong to the virtual LAG group in the virtual port relationship management table 531 such that they are associated with each other.

When the LAG group management table 471 is updated as shown in FIG. 5 and the virtual LAG group management table 521 is updated as shown in FIG. 4 by the above-mentioned operation of the LAG management unit 48, the virtual port relationship management table 531 stored in the virtual port relationship management table storage unit 530 is as shown in FIG. 6.

As described above, the LAG management unit 48 updates the output port management table 441, the broadcast frame transmission permission port management table 451, and the port management table 461, on the basis of the content of the LAG group management table 471, the virtual LAG group management table 521, and the port state management table 501 of the node. According to the node structure in which the frame switch 41 directly refers to the LAG group management table 471, the virtual LAG group management table 521, and the port state management table 501 of the node, it is possible to provide a node structure without the output port management table 441, the broadcast frame transmission permission port management table 451, and the port management table 461. However, in this node structure, an excessively large load is applied to electronic devices forming the frame switch 41 in a network that transfers a large amount of traffic, such as a backbone network. Therefore, it is preferable to use the node structure shown in FIG. 2 in order to improve frame transfer throughput and reduce a delay.

Figure 11:
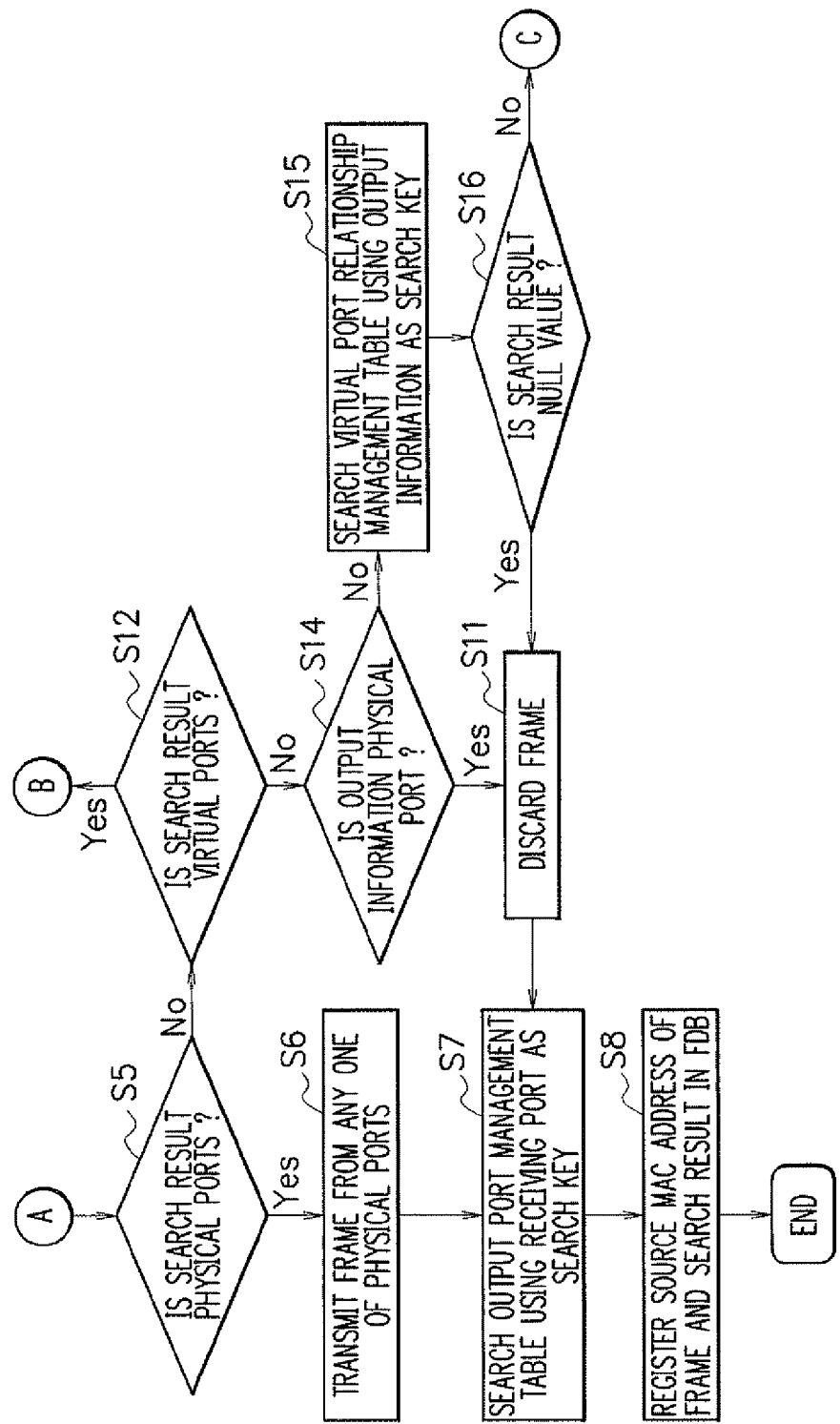
FIG. 11 is a flowchart illustrating an example of the frame transfer operation of the node according to the invention.
Figure 24:
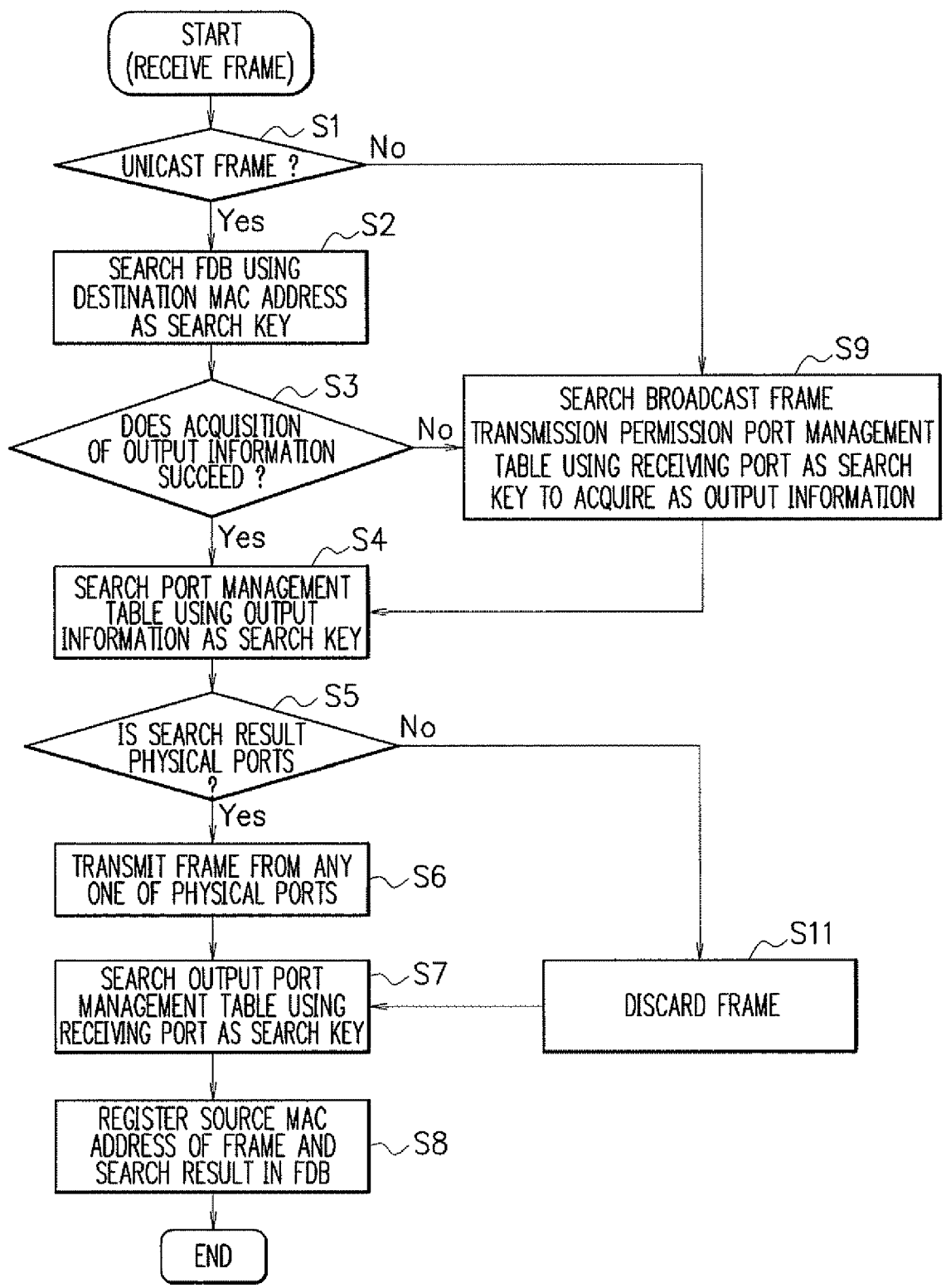
FIG. 24 is a flowchart illustrating a frame transfer operation of the general node.
Figure 25:
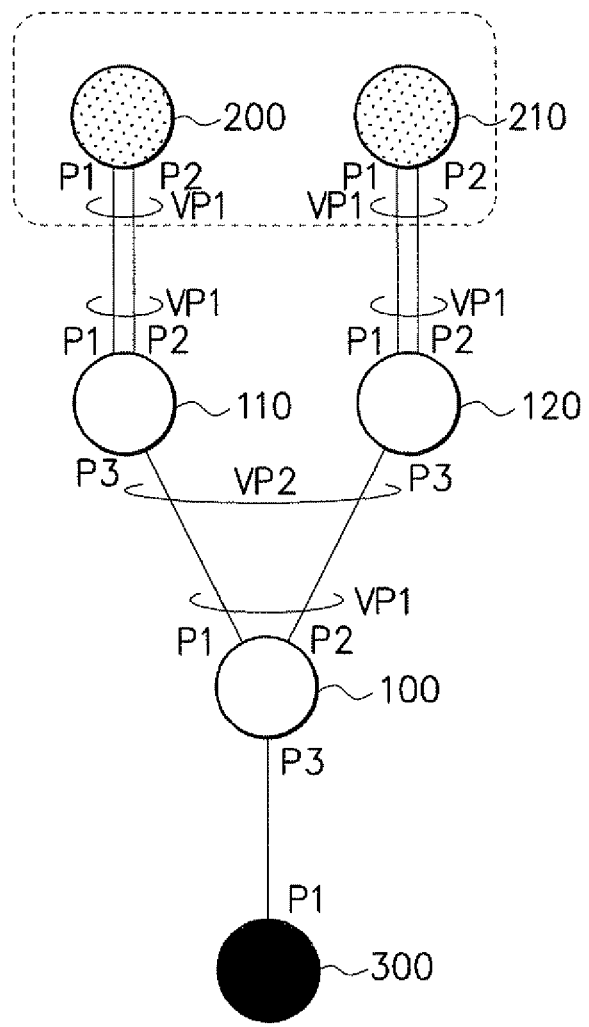
FIG. 25 is a diagram illustrating an example of the configuration of a network.
Figure 26:
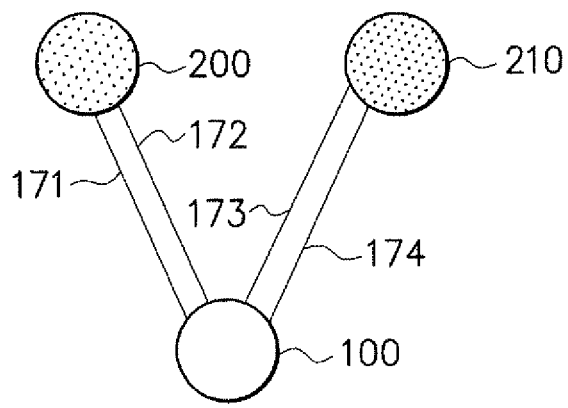
FIG. 26 is a diagram illustrating another example of the configuration of a network.

Next, the frame transfer operation of the node according to the invention will be described. FIGS. 10 and 11 are flowcharts illustrating an example of the frame transfer operation of the node according to the invention. In the flowcharts, the same steps as those in the process performed by the general node shown in FIG. 24 are denoted by the same reference numerals.

When receiving Ethernet frames from other nodes, the input ports 400-1 to 400-5 of the node 10 transmit the received Ethernet frames to the frame switch 41 of the node. The frame switch 41 determines whether the received Ethernet frames are unicast frames (Step S1). For example, the frame switch 41 may determine that the Ethernet frames are unicast frames when the destination MAC address of the Ethernet frame is not a broadcast address. The frame switch 41 may determine that the Ethernet frames are not unicast frames when the destination MAC address of the Ethernet frame is a broadcast address.

When it is determined that the received Ethernet frame is a unicast frame (Yes in Step S1), the frame switch 41 searches the FDB 431 stored in the FDB storage unit 430 of the node using a destination MAC address stored in a header of the Ethernet frame as a search key to acquire output information (Step S2). That is, the frame switch 41 acquires the port identifier of the port transmitting the Ethernet frame from the FDB 431.

When the frame switch 41 fails to acquire the output information in Step S2 (No in Step S3), the frame switch 41 searches the broadcast frame transmission permission port management table 451 stored in the broadcast frame transmission permission port management table storage unit 450 using the port identifier of a receiving port that receives the Ethernet frame as a search key. Then, the frame switch 41 acquires as output information all the port identifiers corresponding to the port identifier of the receiving port that receives the Ethernet frame (Step S9).

When it is determined that the received Ethernet frame is not a unicast frame (No in Step S1), the frame switch 41 also searches the broadcast frame transmission permission port management table 451 using the port identifier of the receiving port that receives the Ethernet frame as a search key, and acquires as output information all the port identifiers corresponding to the port identifier of the receiving port (Step S9).

When it is determined that the received Ethernet frame is not a unicast frame (that is, when the received Ethernet frame is a broadcast frame), and when the frame switch fails to acquire output information in Step S2, the process proceeds to Step S9 to transmit the broadcast frame when transmitting the frame, as described above.

After acquiring the port identifiers as output information in Step S9, the frame switch performs the process after Step S4. When searching the FDB 431 using the destination MAC address as a search key to acquire output information in Step 2 (Yes in Step S3), the frame switch also performs the process after Step S4. In Step S4, the frame switch 41 searches the port management table 461 stored in the port management table storage unit 460 of the node using the output information acquired by searching (output information acquired in Step S9 or Step S2) as a search key, thereby acquiring a port identifier corresponding to the output information (Step S4). In Step S4, the frame switch acquires from the port management table 461 the port identifier of the physical port, the port identifier of the virtual port, or a NULL value. In addition, the port identifiers of a plurality of physical ports may be acquired as the port identifier of the physical port. Similarly, the port identifiers of a plurality of virtual ports may be acquired as the port identifier of the virtual port.

After Step S4, the frame switch 41 determines whether the port identifier acquired in Step S4 is of the physical port (Step S5). When it is determined that the port identifier acquired in Step S4 is of the physical port (Yes in Step S5), the process proceeds to Step S6. When it is determined that the port identifier acquired in Step S4 is not of the physical port, that is, when the port identifier is of a virtual port or when the NULL value is acquired (No in Step S5), the process proceeds to Step S12.

In Step S12, the frame switch 41 determines whether the port identifier acquired in Step S4 is of the virtual port. When it is determined that the port identifier acquired in Step S4 is of the virtual port (Yes in Step S12), the process proceeds to Step S13. When it is determined that the port identifier acquired in Step S4 is not of the virtual port, that is, when the NULL value is acquired (No in Step S12), the process proceeds to Step S14.

In Step S13, the frame switch 41 selects one of the port identifiers of the virtual ports acquired in Step S4, and regards the selected port identifier as output information.

As described above, in Step S4, the port identifiers of a plurality of virtual ports may be acquired as the port identifier of the virtual port. In Step S13, the frame switch 41 selects one of the port identifiers of the virtual ports. If the port identifier of one virtual port is acquired in Step S4, the frame switch 41 may select the port identifier.

In Step S13, the frame switch 41 selects the port identifier of a virtual port according to an algorithm that selects the port identifier of the same virtual port for frames forming the same traffic. The term "traffic" means a set of frames that are generated by dividing all communication data during communication between a source and a destination. The source and the destination are not limited to nodes, but they may be terminals or software installed in the terminals. The frame switch 41 selects a port identifier according to an algorithm that can select the port identifier of the same virtual port when receiving a frame A and proceeding to Step S13 and when receiving the frame A and a frame B that is common to the source and the destination and proceeding to Step S13.

An example of the algorithm that selects the port identifier of the same virtual port for the frames forming the same traffic will be described below. When the process proceeds to Step S13, the frame switch 41 orders the port identifiers of the virtual ports. For example, the frame switch 41 numbers the port identifiers from 0 in descending order (or ascending order) of values represented by bit strings indicating the port identifiers. The frame switch 41 may divide the sum of a value indicated by a bit string of the destination address of the received Ethernet frame and a value indicated by a bit string of the source address by the number of port identifiers to be selected, and select a port identifier with an order corresponding to the remainder. For example, when one of the port identifiers VP1 and VP2 of the virtual ports is selected, the port identifier VP1 is a zero-th port identifier and the port identifier VP2 is a first port identifier. The frame switch 41 divides the sum of a value indicated by a bit string of the destination address of the received Ethernet frame and a value indicated by a bit string of the source address by the number of port identifiers to be selected (in this embodiment, 2). When the remainder is zero, the frame switch selects the port identifier VP1. When the remainder is 1, the frame switch selects the port identifier VP2. In addition, this algorithm is an example of the algorithm that selects the port identifier of the same virtual port for the frames forming the same traffic. The frame switch 41 may select port identifiers according to algorithms other than the above as long as they can select the port identifier of the same virtual port for frames forming the same traffic.

When the output information that is used as a search key in Step S4 is the port identifier of the virtual port allocated to the virtual LAG group, the process proceeds to Step S13. When the source and the destination receive a common Ethernet frame, Steps S4, S5, and S12 are performed using the port identifiers of the virtual ports allocated to the virtual LAG group as output information, and then the process proceeds to Step S13. In Step S13, the port identifiers of the virtual ports are selected by the above-mentioned algorithm. In this way, it is possible to select the same port identifier from the port identifiers of the virtual ports belonging to the virtual LAG group.

In Step S13, the frame switch 41 selects the port identifier of one virtual port, and the process proceeds to Step S4 again. The frame switch 41 repeatedly performs Steps S4, S5, S12, and S13 until the port identifiers of one or more "physical ports" or a NULL value is acquired in Step S4.

When the port identifier acquired in Step S4 is not of a virtual port, that is, when a NULL value is acquired (No in Step S12), the frame switch 41 determines whether the output information used as the search key in Step S4 is the port identifier of the physical port (Step S14).

When it is determined that the output information used as the search key in Step S4 is the port identifier of the physical port (Yes in Step S14), the frame switch 41 discards the received Ethernet frame (Step S11), and the process proceeds to Step S7.

When it is determined that the output information used as the search key in Step S4 is not the port identifier of the physical port (No in Step S14), the process proceeds to Step S15. In Step S15, the frame switch 41 searches the virtual port relationship management table 531 (see FIG. 6) stored in the relationship management table storage unit 530, using the output information used as the search key in Step S4 (in this case, the port identifier of the virtual port) as a search key, to acquire the port identifier of the virtual port allocated to the virtual LAG group including the virtual ports (Step S15).

Then, the frame switch 41 determines whether the result searched in Step S15 is a NULL value (Step s16). When it is determined that the result searched in Step S15 is a NULL value (Yes in Step S16), the frame switch 41 discards the received Ethernet frame (Step S11), and proceeds to Step S7.

On the other hand, when it is determined that the result searched in Step S15 is not the NULL value (No in Step S16), the process proceeds to Step S4, and repeats the process after Step S4 using the port identifier of the virtual port acquired in Step S15 as the output information. When the process proceeds from Step S16 to Step S4, the frame switch 41 may search the port management table 461 using the port identifier of the virtual port acquired in Step S15 as a search key.

When it is determined that the port identifier acquired in Step S4 is of the physical port (Yes in Step S5), the frame switch 41 selects the port identifier of one physical port from the port identifiers acquired in Step S4 (in this case, the port identifiers of the physical ports), and transmits the received Ethernet frame from a physical port corresponding to the selected port identifier (Step S6). In addition, as described above, in Step S4, the port identifiers of a plurality of virtual ports may be acquired as the port identifier of the virtual port.

When the port identifier of only one physical port is acquired in Step S4, the port identifier may be selected in Step S6. On the other hand, when the port identifiers of a plurality of physical ports are acquired, the frame switch 41 may select one physical port in Step S6 as follows. For example, the frame switch may use some or all of the information items stored in the received Ethernet frame as parameters and select port identifiers corresponding to the parameters. For example, when the process proceeds to Step S6, the frame switch 41 orders the port identifiers of the physical ports. For example, the frame switch 41 numbers the port identifiers from 0 in descending order (or ascending order) of values represented by bit strings indicating the port identifiers. The frame switch 41 may divide a value indicated by a bit string of information, serving as the parameter, by the number of port identifiers of the physical ports to be selected, and select a port identifier with an order corresponding to the remainder. For example, when one of the port identifiers P1 and P2 of the physical ports is selected, the port identifier P1 is a zero-th port identifier and the port identifier P2 is a first port identifier. The frame switch 41 divides the parameter by the number of port identifiers to be selected (in this embodiment, 2). When the remainder is zero, the frame switch selects the port identifier P1. When the remainder is 1, the frame switch selects the port identifier P2. For example, information stored in a payload or a header of the Ethernet frame (for example, a destination MAC address, a source MAC address, a VLAN identifier, and priority) may be used as the parameter.

After transmitting the Ethernet frame in Step S6, or after discarding the Ethernet frame in Step S11, the frame switch 41 searches the output port management table 441 stored in the output port management table storage unit 440 of the node, using the port identifier of a receiving port that receives the Ethernet frame as a search key, to acquire a port identifier corresponding to the search key (Step S7). The port identifier acquired in Step S7 may be registered as the output information in the FDB 431. After Step S7, the frame switch 41 registers the source MAC address of the received Ethernet frame as destination information in the FDB 431, and registers the port identifier acquired in Step S7 as output information corresponding to the destination information in the FDB 431 (Step S8).

When a plurality of port identifiers are acquired as the output information in Step S9, the frame switch 41 performs the process after Step S4 on each of the port identifiers.

Next, the failure recovery operation of the node 10 according to the invention when a link is disconnected will be described. Here, the failure recovery operation of the node 10 according to the invention when a link between the port 2 of the node 10 and the port 2 of the node 20 is disconnected in the network shown in FIG. 1 will be described.

When the link connected to the node 10 is disconnected, the port state management unit 490 of the node 10 updates the state of the port connected to the disconnected link from an available state to an unavailable state in the port state management table 501 stored in the port state management table storage unit 500 of the node. When the link connected to the port P2 of the node 10 is disconnected as in this example, the port state management unit 490 of the node 10 updates the state of the port P2 from an available state to an unavailable state in the port state management table 501. In addition, the port state management unit 490 updates the port state management table 501, and notifies the LAG management unit 48 of the node that the port state management table 501 has been updated.

The LAG management unit 48 receiving the notification from the port state management unit 490 of the node updates the port management table 461. The operation of the LAG management unit 48 of the node according to the invention updating the port management table 461 has already been described above. In this example, the LAG management unit deletes the port identifier of the port P2 from the port management table 461.

Figure 16:
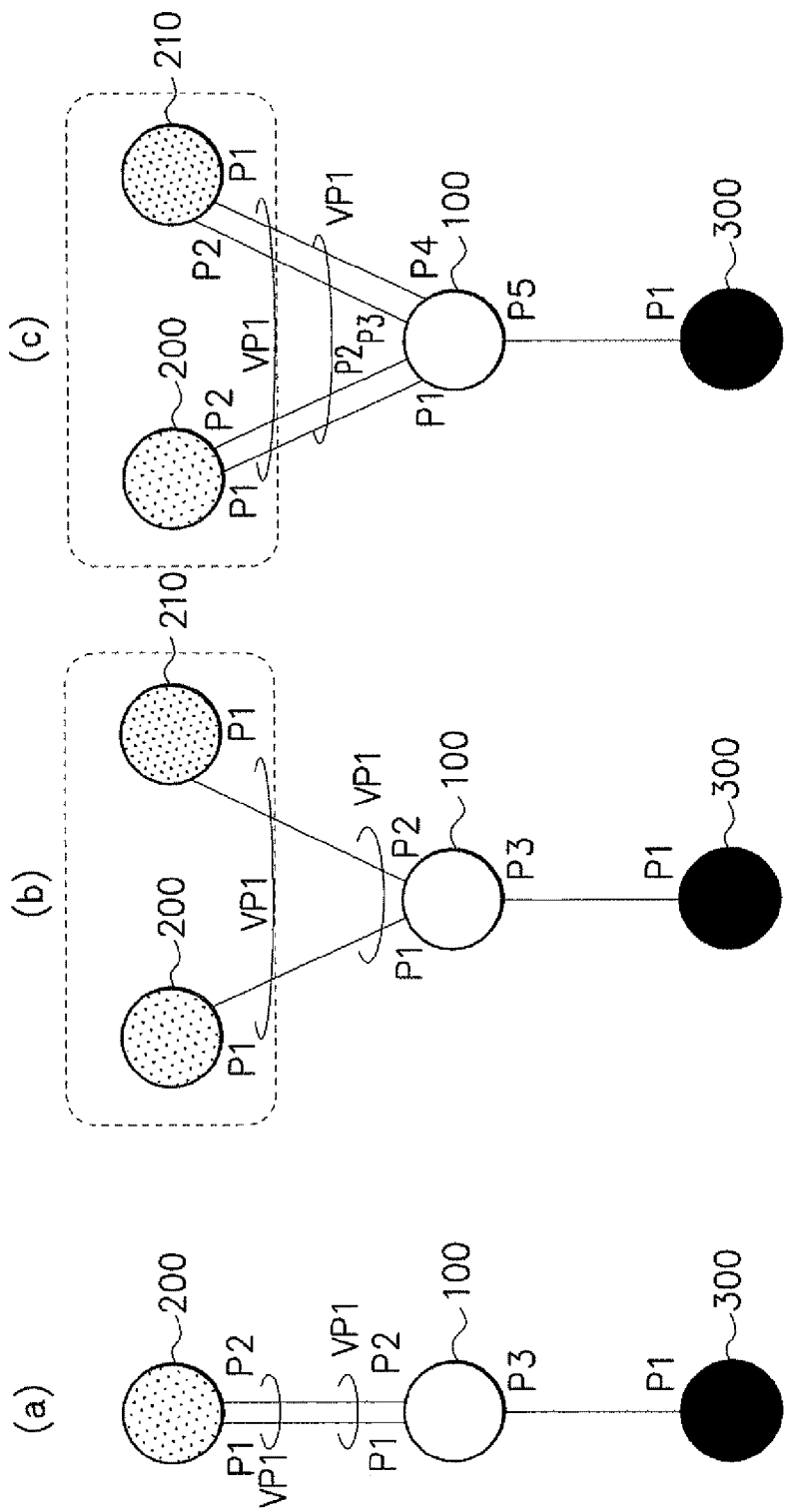
FIGS. 16A to 16C are diagrams illustrating examples of a network to which LAG is applied.

The above-mentioned operation is the same as that of the general node 100, shown in FIG. 17, updating the port management table 461 when a link is disconnected. However, in the general node 100 shown in FIG. 17, the unicast Ethernet frame transferred from the port P2 of the node 100 to the node 200 (see FIG. 16C) before a failure occurs is transferred to any one of the physical ports P1, P3, and P4 belonging to the virtual port VP1 including the port P2. Therefore, in the network shown in FIG. 16C, the destination node of the Ethernet frame is likely to be changed from the node 200 to the node 210.

Meanwhile, among the physical ports of the node 10 according to the invention, the physical ports connected to the same node are registered in the same LAG group, and the virtual port allocated to the LAG group is registered in the virtual LAG group. In addition, the virtual ports connected to the redundant nodes 20 and 21 are registered in the same virtual LAG group. As a result, in the FDB 431, different output information items are set for the redundant nodes 20 and 21. Further, the port management table 461 in which the port identifiers of the physical ports capable of receiving/transmitting Ethernet frames are registered in each virtual port allocated to the LAG group of the node and each physical port that does not belong to any LAG group is made. As described above, after the link is disconnected, only the port identifier P1 of the physical port registered in the port management table 461 belongs to the virtual port VP1 that is set as the output information in the FDB 431 of the node 10. Therefore, in the node 10 according to this embodiment, even though the link is disconnected as described above, there is no change in the destination node of the Ethernet frame from the node 20 to the node 21.

In the general node 100 shown in FIG. 17, there is a fear that the destination node of a broadcast Ethernet frame that is transferred from the port 2 of the node 100 to the node 200 (see FIG. 16C) before the link is disconnected will be changed to the node 210.

However, in the node 10 according to the invention, when the output information used as the search key in Step S4 is the port identifier of the virtual port allocated to the virtual LAG group and one of the virtual identifiers is selected from the port identifiers of the virtual ports belonging to the virtual LAG group, the same port identifier is selected all the time in Step S13. For example, it is assumed that when the broadcast Ethernet frame is transferred, VP3 (the port identifier of the virtual port allocated to the virtual LAG group) is acquired from the broadcast frame transmission permission port management table 451 shown in FIG. 8 in Step S9. Then, when the process proceeds to Step S13 through Steps S4, S5, and S12, the frame switch 41 selects the port identifier of the virtual port according to the algorithm that selects the port identifier of the same virtual port for the frames forming the same traffic. Therefore, there is no change in the operation of selecting the virtual port VP1 from the virtual ports VP1 and VP2 belonging to the virtual port VP3 before and after a link failure occurs. As a result, there is no change in the destination node of the Ethernet frame.

As such, according to the invention, when only one of the links between the node 10 and the node 20 is disconnected, the destination node of the Ethernet frame is not changed, which prevents the problem of the waste of a communication band due to the reestablishment of the session or the problem of the change in the order of the Ethernet frames.

When the other link between the node 10 and the node 20 is disconnected and thus two links between the node 10 and the node 20 are both disconnected, the operation of the node 10 transferring the Ethernet frame is as follows.

In this case, the port state management unit 490 of the node 10 updates the state of the port P1 from an available state to an unavailable state in the port state management table 501, and notifies the LAG management unit 48 that the port state management table 501 has been updated. Then, the LAG management unit 48 updates the port management table 461. As a result, in the port management table 461 shown in FIG. 9, information corresponding to VP1 is updated to a NULL value. In addition, since both the physical ports P1 and P2 belonging to the virtual port VP1 are unavailable, only the port identifier VP2 corresponds to the virtual port VP3 in the port management table 461 shown in FIG. 9.

In this case, it is assumed that the Ethernet frame, which is a unicast frame, is received, and VP1 is searched as output information in Step S2. Then, in Step S4, the frame switch 41 acquires the NULL value using output information VP1 as a search key from the port management table 461. As a result, after Step S4, the process proceeds to Step S15 through Steps S5, S12, and S14. In Step S15, the frame switch searches the virtual port relationship management table 531 (see FIG. 6), using VP1 that is used as the output information in Step S4 as the search key, to acquire the port identifier VP3 of the virtual port allocated to the virtual LAG group including the virtual port VP1. Then, the process proceeds to Step S4 again, and the frame switch searches the port management table 461 using the port identifier VP3 as the search key. In this case, only the port identifier of the virtual port VP2 including the available physical port is registered for the virtual port VP3 in the port management table 461 of the node 10. Therefore, the frame switch 41 acquires VP2 from the port management table 461 using the port identifier VP3 as the search key.

Thereafter, VP2 is the port identifier of the virtual port. Therefore, the process proceeds to Step S13 through Steps S5 and S12, and the frame switch 41 selects one of the physical ports P3 and P4 belonging to the virtual port VP2 as a physical port for transmitting the received unicast Ethernet frame.

When the Ethernet frame received from the node 30 is broadcast transmitted, the frame switch acquires VP3 from the broadcast frame transmission permission port management table 451 in Step S9. Then, the frame switch 41 acquires V2 from the port management table 461 using VP3 as a search key in Step S4. Then, the process proceeds to Step S13 through Steps S5 and S12, and the frame switch 41 selects one of the physical ports P3 and P4 belonging to the virtual port VP2 as a physical port for broadcast transmitting the received Ethernet frame.

As described above, when two links between the node 10 and the node 20 are both disconnected and the node 10 is completely disconnected from the node 20, the destination node of the Ethernet frame is changed first from the node 200 to the node 210.

Next, a failure recovery operation when another node connected to the node 10 is out of order will be described.

A connection failure between the node 10 and another node means that all the links between another node and the node 10 are disconnected. Therefore, the above-mentioned recovery operation when a plurality of links are disconnected is performed. For example, when the node 20 is out of order, the same recovery operation as that when two links between the node 20 and the node 10 are both disconnected is performed. When the node 21 is out of order, the same recovery operation as that when two links between the node 21 and the node 10 are both disconnected is also performed.

According to this embodiment, it is possible to construct a network with high reliability capable of solving the problem of the change in the order of the frames forming traffic when the links are disconnected.

The configuration of the network shown in FIG. 1 is just illustrative, but the configuration of the network including the node according to the invention is not limited to the configuration of the network shown in FIG. 1.

Further, in the above-described embodiment, a first virtual port storage unit is implemented by the LAG group management table storage unit 470. A second virtual port storage unit is implemented by the virtual LAG group management table storage unit. A frame destination determining unit is implemented by the frame switch 41.

The frame destination determining unit may include: a port specifying unit that specifies the physical ports which do not belong to the virtual port, or the virtual port, which is a group of a plurality of physical ports, in correspondence with the destination of the received frame; a physical port specifying unit that specifies the physical ports connected to the link which is not out of order, among the physical ports belonging to the virtual port; a physical port determining unit that determines one of the physical ports specified by the physical port specifying unit as the port for transmitting the frame; a host virtual port specifying unit that, when the physical port specifying unit cannot specify the physical ports connected to the link which is not out of order among the physical ports belonging to the virtual port, specifies the host virtual port including the virtual port; a client virtual port specifying unit that specifies the virtual ports belonging to the host virtual port specified by the host virtual port specifying unit; and a virtual port determining unit that uniquely determines the virtual port according to the destination and source of the received frame, among the virtual ports specified by the client virtual port specifying unit. When the port specifying unit specifies the virtual ports and the virtual port determining unit determines the virtual port, the physical port specifying unit specifies the physical ports connected to the link which is not out of order, among the physical ports belonging to the virtual port.

In the above-described embodiment, the port specifying unit is implemented by the frame switch 41 that performs Step S2. The physical port specifying unit is implemented by the frame switch 41 that performs Step S4 after Step S2 and Step S13. The physical port determining unit is implemented by the frame switch 41 that performs Step S6. The host virtual port specifying unit is implemented by the frame switch 41 that performs Step S15. The client virtual port specifying unit is implemented by the frame switch 41 that performs Step S4 after Step S15. The virtual port determining unit is implemented by the frame switch 41 that performs Step S13.

The next configuration is also available. The frame destination determining unit includes a broadcast frame transmission port selecting unit that, when a broadcast frame is received, selects a physical port or a virtual port corresponding to the physical port receiving the broadcast frame. When the broadcast frame transmission port selecting unit selects the virtual port, the physical port specifying unit specifies physical ports connected to the link that is not out of order among the physical ports belonging to the virtual port.

Further, the next configuration is also available. When the physical port receiving the broadcast frame belongs to any virtual port, which is a group of a plurality of physical ports, the broadcast frame transmission port selecting unit selects the virtual port that is set in the node, does not include the physical port receiving the broadcast frame, and does not belong to any host virtual port, which is a group of a plurality of virtual ports, and the physical ports that do not belong to any virtual port, which is a group of a plurality of physical ports. When the physical port receiving the broadcast frame does not belong to any virtual port, which is a group of a plurality of physical ports, the broadcast frame transmission port selecting unit selects the virtual port that is set in the node and does not belong to any host virtual port, which is a group of a plurality of virtual ports, and physical ports other than the physical port receiving the broadcast frame, among the physical ports that do not belong to any virtual port, which is a group of a plurality of physical ports.

In the above-described embodiment, the broadcast frame transmission port selecting unit is implemented by the frame switch 41 that performs Step S9.

Further, the next configuration is also available. The node according to this embodiment further includes: a forwarding database storage unit that stores a forwarding database in which the physical ports or the virtual ports are associated with output information indicating the port for transmitting the frame to a frame destination; an output port management table storage unit that stores an output port management table, which is a database in which the physical ports for receiving frames are associated with the physical ports or the virtual ports serving as the output information; an output port management table registration unit that registers, in the output port management table, the physical ports, which are associated with the virtual port including the physical ports in the virtual port in the first virtual port storage unit, and the virtual port including the physical ports such that they are associated with each other, and registers, in the output port management table, physical ports that do not belong to any virtual port and the physical ports such that they are associated with each other; and a forwarding database registration unit that, when a frame is received, searches a physical port or a virtual port corresponding to the physical port receiving the frame from the output port management table, and registers, in the forwarding database, the searched physical port or virtual port as the output information, and the source of the received frame as the destination such that they are associated with each other. The port specifying unit searches a physical port or a virtual port corresponding to the destination of the received frame from the forwarding database, thereby specifying the physical port or the virtual port.

In the above-described embodiment, the forwarding database storage unit is implemented by the FDB storage unit 430. The output port management table storage unit is implemented by the output port management table storage unit 440. The output port management table registration unit is implemented by the LAG management unit 48. The forwarding database registration unit is implemented by the frame switch 41 that performs Steps S7 and S8.

Second Exemplary Embodiment

Next, a second exemplary embodiment of the invention will be described. In the second exemplary embodiment of the invention, a node 10 is also included in the configuration of the network shown in FIG. 1. In the node according to the first exemplary embodiment shown in FIG. 2, the port identifiers of the physical ports or the port identifiers of the virtual ports (that is, the virtual ports each of which is a group of a plurality of physical ports) allocated to the LAG groups are registered in the output information field of the FDB 431 (see FIG. 3). In contrast, in the node according to the second exemplary embodiment, the port identifiers of physical ports, the port identifier of virtual ports allocated to LAG groups, and the port identifier of a virtual port (that is, a virtual port, which is a group of a plurality of virtual ports) allocated to a virtual LAG group are registered in the output information field of the FDB 431.

In the following description, the port identifiers of the physical ports, the port identifier of the virtual port allocated to each LAG group, or the port identifier of the virtual port allocated to the virtual LAG group registered in the output information field of the FDB of the node 10 according to the second exemplary embodiment can be designated for each kind of traffic.

Identification information for identifying the kind of traffic is referred to as a traffic identifier. As the traffic identifier, any of the following can be used: a destination node identifier (destination address) stored in a received Ethernet frame; a source node identifier (source address); a VLAN identifier; priority of traffic; and combinations of some or all of these identifiers. In this embodiment, the VLAN identifier is used as the traffic identifier.

FIG. 12 is a block diagram illustrating an example of the configuration of the node 10 according to the second exemplary embodiment. In the node according to the second exemplary embodiment, the same components as those in the node according to the first exemplary embodiment are denoted by the same reference numerals, and a detailed description thereof will be omitted. The node 10 according to the second exemplary embodiment includes input ports 400-1 to 400-5; a frame switch 41a, output ports 420-1 to 420-5, an FDB storage unit 430, an output port management table storage unit 440, a broadcast frame transmission permission port management table storage unit 450, a port management table storage unit 460, a LAG group management table storage unit 470, a LAG management unit 48, a port state management unit 490, a port state management table storage unit 500, a setup interface unit 51, a virtual LAG group management table storage unit 520, a virtual port relationship management table storage unit 530, and a traffic management table storage unit 540.

The traffic management table storage unit 540 is a storage device that stores a traffic management table. The traffic management table stored in the traffic management table storage unit 540 is a database in which traffic identifiers and port identifiers registered in the FDB according to this embodiment as output information are associated with each other. In the traffic management table, the port identifier of the virtual port or the identifier of the physical port is associated with the traffic identifier. The port identifier of the virtual port associated with the traffic identifier may be the port identifier of the virtual port allocated to the LAG group or the port identifier of the virtual port allocated to the virtual LAG group.

FIG. 13 is a diagram illustrating an example of the traffic management table. In the traffic management table 541 shown in FIG. 13, VLAN identifiers are used as the traffic identifiers. As shown in FIG. 13, in the traffic management table 541, port identifiers, serving as output information, are associated with the traffic identifiers (in this embodiment, VLAN identifiers). In addition, in FIG. 13, the port identifier of the virtual port allocated to the virtual LAG group is associated with the VLAN identifiers.

When an Ethernet frame storing the traffic identifier indicated by the traffic management table 541 is received by the physical port indicated by a port identifier corresponding to the traffic identifier, or a physical port belonging to the virtual port indicated by a port identifier corresponding to the traffic identifier, the traffic management table 541 indicates that the port identifier, serving as the output information, may be registered in the FDB in association with a combination of the traffic identifier and destination information, which is the source MAC address of the Ethernet frame. For example, a first entry of the traffic management table 541 shown in FIG. 13 means that, when a physical port belonging to VP3 receives traffic with VLAN identifier No. 1, VP3 is registered in an output information field of an FDB 432 (see FIG. 14).

The traffic management table 541 is referred to by the frame switch 41*a* during MAC address learning.

In this embodiment, the setup interface unit 51 is also used as a user interface that is used for a node administrator to update the traffic management table 541 (registration or modification of data). The setup interface unit 51 is operated by the administrator to update the traffic management table 541 in response to instructions from the administrator as well as the LAG group management table 471 and the virtual LAG group management table 521.

Further, the second exemplary embodiment differs from the first exemplary embodiment in that the node 10 includes the traffic management table storage unit 540 and the content of the FDB stored in the FDB storage unit 430 is different from that in the first exemplary embodiment. In the first exemplary embodiment, the destination information (the node identifier of a destination node) is associated with the output information in the FDB.

In contrast, in the second exemplary embodiment, output information is associated with a combination of the destination information and the traffic identifier in the FDB stored in the FDB storage unit 430. In addition, as the output information, the port identifiers of the physical ports, the virtual port allocated to the LAG group, the port identifier of the virtual port allocated to the virtual LAG group may be registered in the FDB.

FIG. 14 is a diagram illustrating an example of the FDB stored in the FDB storage unit 430 according to the second exemplary embodiment. As shown in FIG. 14, in the FDB 432 according to this embodiment, a port identifier, serving as the output information, is registered so as to be associated with a combination of destination information and a traffic identifier (in this embodiment, a VLAN identifier). For example, the first entry shown in FIG. 14 indicates that VP3 is an output port for an Ethernet frame which includes VLAN identifier No. 1 and whose destination is the node 200.

The frame switch 41*a* provided in the node 10 according to the second exemplary embodiment performs the same operation as the frame switch 41 according to the first exemplary embodiment to transmit the received Ethernet frame, but frame switch 41*a* differs from the frame switch 41 according to the first exemplary embodiment in a MAC address learning process.

As described above, the frame switch 41*a* provided in the node 10 according to the second exemplary embodiment performs the same operation of sending (transferring) the received Ethernet frame to another node as the frame switch 41 according to the first exemplary embodiment except for the MAC address learning process. That is, when receiving an Ethernet frame from another node, the frame switch 41*a* according to the second exemplary embodiment performs operations after Step S1 shown in FIG. 10. In Steps S1 to S6, Step S9, and Step S11 to S16 (see FIGS. 10 and 11), the frame switch 41*a* performs the same process as the frame switch 41 according to the first exemplary embodiment. However, in Step S2, the frame switch 41*a* acquires, from the FDB 432, output information corresponding to a VLAN identifier and a destination MAC address stored in the received Ethernet frame.

Next, the MAC address learning performed by the frame switch 41*a* according to the second exemplary embodiment will be described. The frame switch 41*a* performs the MAC address learning after, for example, Step S6 or Step S11 shown in FIG. 10. FIG. 15 is a flowchart illustrating an example of the MAC address learning process according to the second exemplary embodiment.

The frame switch 41*a* transmits the Ethernet frame in, for example, Step S6, or discards the received Ethernet frame in Step S11, and proceeds to Step S17. However, since the traffic identifier included in the received Ethernet frame is used in Step S17, the frame switch 41*a* extracts the traffic identifier included in the Ethernet frame before discarding the Ethernet frame in Step S1. In this embodiment, since a VLAN identifier is used as the traffic identifier, the traffic identifier is referred to as the VLAN identifier in the following description.

In Step S17, the frame switch 41*a* searches the traffic management table 541 (see FIG. 13) using the VLAN identifier included in the received Ethernet frame as a search key to acquire a port identifier corresponding to the VLAN identifier (Step S17). In Step S17, the frame switch 41*a* acquires the port identifier that is registered in the FDB 432 as output information.

Then, the frame switch 41*a* determines whether the acquisition of the port identifier succeeds in Step S17 and whether the port receiving the Ethernet frame belongs to the virtual port indicated by the port identifier acquired in Step S17 (Step S18). Next, a process when the acquisition of the port identifier succeeds in Step S17 will be described. In Step S18, when the port identifier acquired in Step S17 is of the virtual port, the frame switch 41*a* uses the acquired port identifier as a search key to acquire, from the port management table 461, the port identifiers of virtual ports or physical ports belonging to the virtual port. In this case, when the port identifiers of the virtual ports are acquired from the port management table 461, the frame switch 41*a* uses the port identifier of each of the acquired virtual ports as a search key to acquire, from the port management table 461, the port identifiers of virtual ports or physical ports belonging to the virtual port again. The frame switch 41*a* repeatedly performs the process of searching the port management table 461 until the port identifiers of the physical ports are acquired from the port management table 461. For example, it is assumed that the port management table 461 shown in FIG. 9 is made and VP3 is acquired in Step S17. In this case, the frame switch 41*a* acquires VP1 and VP2 from the port management table 461, using VP3 as a search key. Since VP1 and VP2 are the port identifiers of virtual ports, the frame switch 41*a* acquires P1, P3, and P4 using VP1 and VP2 as a search key. When the port identifier of the physical port receiving the Ethernet frame is included in the port identifiers of the physical ports acquired from the port management table 461, the frame switch 41*a* determines that the port receiving the Ethernet frame belongs to the virtual port indicated by the port identifier acquired in Step S17 (Yes in Step S18). On the other hand, when the port identifier of the physical port receiving the Ethernet frame is not included in the port identifiers of the acquired physical ports, the frame switch 41*a* determines that the port receiving the Ethernet frame does not belong to the virtual port indicated by the port identifier acquired in Step S17 (No in Step S18).

When the acquisition of the port identifier succeeds in Step S17 and it is determined that the port receiving the Ethernet frame belongs to the virtual port indicated by the port identifier acquired in Step S17 (Yes in Step S18), the process proceeds to Step S8a. If not (No in Step S18), the process proceeds to Step S7a.

When the port identifiers acquired in Step S17 are of the physical ports and include the port identifier of the physical port receiving the Ethernet frame (Yes in Step S18), the process proceeds to Step S8a. On the other hand, when the port identifiers acquired in Step S17 are of the physical ports and do not include the port identifier of the physical port receiving the Ethernet frame (No in Step S18), the process proceeds to Step S7a.

If the acquisition of the port identifier fails in Step 17 (No in Step s18), the process proceeds to Step S7a.

In Step S8a, the frame switch 41a uses the source MAC address of the received Ethernet frame as destination information to register, in the FDB 432, a combination of the destination information and the VLAN identifier stored in the received Ethernet frame, and output information such that the combination is associated with the output information (Step S8a). If the determination result in Step S18 is "Yes" and then Step S8a immediately after Step S18 is performed, the frame switch 41a registers the port identifiers acquired in Step S17 as the output information in the FDB 432.

When the determination result in Step S18 is "No", for example, when the acquisition of the port identifier fails in Step 17, or when the port receiving the Ethernet frame does not belong to the virtual port indicated by the port identifier acquired in Step S17, the frame switch 41a searches the output port management table 441, using the port identifier of the physical port receiving the Ethernet frame as a search key, to acquire a port identifier corresponding to the search key (Step S7a). Then, the process proceeds to Step S8a. Even when Step S8a is performed after Step S7a, the frame switch 41a uses the source MAC address of the received Ethernet frame as destination information to register, in the FDB 432, a combination of the destination information and the VLAN identifier stored in the received Ethernet frame, and output information such that the combination is associated with the output information. However, the port identifier acquired in Step S7a is registered as the output information in the FDB 432.

The MAC address learning may cause the port identifier of the virtual port allocated to the virtual LAG group in addition to the port identifiers of the physical ports and the virtual port allocated to the LAG group to be registered in the output information field of the FDB.

Therefore, in Step S2, the frame switch 41a may search the FDB 432, using a combination of the destination MAC address and the VLAN identifier stored in the header of the Ethernet frame as the search key, to acquire, as output information, the port identifier of the virtual port (the virtual port, which is a group of a plurality of virtual ports) allocated to the virtual LAG group in addition to the port identifiers of the physical ports and the virtual port allocated to the LAG group.

In this case, in Step S4, the frame switch 41a searches the port management table 461, using the port identifier of the virtual port allocated to the virtual LAG group as the search key, to acquire the port identifiers of virtual ports belonging to the virtual port (Step S4). Then, the process proceeds to Step S13 through Steps S5 and S12. In this case, the frame switch 41a selects one of the port identifiers of the virtual ports acquired in the previous Step S4. The process of Step S13 is the same as that of Step S13 according to the first exemplary embodiment.

In the first exemplary embodiment, Step S13 is performed after the port identifier of the virtual port allocated to the virtual LAG group is acquired in Step S15 (see FIG. 11) and then Steps S16, S4, S5, and S12 are performed. In the second exemplary embodiment, even when Step S15 is not performed, the port identifier of the virtual port allocated to the virtual LAG group is acquired in Step S2, and then the process proceeds to Step S13 through Steps S4, S5, and S12 to select one of the port identifiers of the virtual ports belonging to the virtual port allocated to the virtual LAG group.

This process will be described in detail below. It is assumed that the traffic management table 541 shown in FIG. 13 is set and the FDB 432 shown in FIG. 14 is generated. When receiving from the node 30 shown in FIG. 1 an Ethernet frame with VLAN identifier No. 1 or 2, first, the node 10 acquires as output information the port identifier of the virtual port VP3 including the virtual ports VP1 and VP2 in Step S2. Then, in Step S4, the virtual ports VP1 and VP2 belonging to the virtual port VP3 are acquired, and the process proceeds to Step S13 through Steps S5 and S12 to select one of the virtual ports VP1 and VP2. Then, Step S4 is performed again to acquire the port identifiers P1 and P2 of the physical ports belonging to the virtual port VP1 or the port identifiers P3 and P4 of the physical ports belonging to the virtual port VP2, and a physical port for transmitting the Ethernet frame is determined in Step S6.

When an Ethernet frame with a VLAN identifier other than the VLAN identifier No. 1 or 2 is received, similar to the first exemplary embodiment, the identifiers of the physical ports or the port identifiers of the virtual ports allocated to the LAG groups are acquired in Step S2, and then the process after Step S2 is performed.

In the above-described example, since traffic with VLAN identifier No. 1 or 2 may be transmitted to either the node 20 or the node 21, it is possible to disperse a traffic load by registering the virtual port VP3 in the output information field of the FDB 432 of the node 10, and thus to expand the communication band.

In the second exemplary embodiment, a first virtual port storage unit is implemented by the LAG group management table storage unit 470. A second virtual port storage unit is implemented by the virtual LAG group management table storage unit. A frame destination determining unit is implemented by the frame switch 41a.

Further, the frame destination determining unit may include: a port specifying unit that specifies the physical ports which do not belong to any virtual port, the virtual ports, which are groups each including a plurality of physical ports, or the host virtual port, which is a group of a plurality of virtual ports, in correspondence with the destination of the received frame; a physical port specifying unit that specifies the physical ports connected to the link which is not out of order, among the physical ports belonging to the virtual port; a physical port determining unit that determines one of the physical ports specified by the physical port specifying unit as the port for transmitting the frame; a host virtual port specifying unit that, when the physical port specifying unit cannot specify the physical ports connected to the link which is not out of order among the physical ports belonging to the virtual port, specifies the host virtual port including the virtual port; a client virtual port specifying unit that specifies the virtual ports belonging to the host virtual port specified by the host virtual port specifying unit or the virtual ports belonging to the host virtual port, which is a group of a plurality of virtual ports, specified by the port specifying unit; and a virtual port determining unit that uniquely determines the virtual port according to the destination and source of the received frame, among the virtual ports specified by the client virtual port specifying unit. When the port specifying unit specifies the virtual ports, which are groups each including a plurality of physical ports, and the virtual port determining unit determines the virtual port, which is a group of a plurality of physical ports, the physical port specifying unit may specify the physical ports connected to the link which is not out of order, among the physical ports belonging to the virtual port.

In the second exemplary embodiment, the port specifying unit is implemented by the frame switch 41a that performs Step S2. The physical port specifying unit is implemented by the frame switch 41a that performs Step S4 after Steps S2 and S13. The physical port determining unit is implemented by the frame switch 41a that performs Step S6.

The host virtual port specifying unit is implemented by the frame switch 41a that performs Step S15. The client virtual port specifying unit is implemented by the frame switch 41a that performs Step S4 after Step S15 or Step S2. The virtual port determining unit is implemented by the frame switch 41a that performs Step S13.

Further, in the second exemplary embodiment, the broadcast frame transmission port selecting unit is implemented by the frame switch 41a that performs Step S9.

The node according to this embodiment may further include: a forwarding database storage unit that stores a forwarding database in which the physical ports, the virtual ports, which are groups each including a plurality of physical ports, or the host virtual port, which is a group of a plurality of virtual ports, are associated as output information indicating the port for transmitting the frame with a combination of the destination of the frame and a traffic identifier of the frame; a traffic management table storage unit that stores a traffic management table, which is a database in which the traffic identifier of the frame is associated with the physical port or the virtual port serving as the output information; and a forwarding database registration unit that, when a frame is received, searches a physical port or a virtual port corresponding the traffic identifier of the frame from the traffic management table, and registers, in the forwarding database, the searched physical port or virtual port, serving as the output information, and a combination of the destination of the received frame and the traffic identifier of the frame such that they are associated with each other. The host virtual port, which is a group of a plurality of virtual ports, may be associated with the traffic identifier in the traffic management table, and the port specifying unit may search a physical port or a virtual port corresponding to the destination of the received frame from the forwarding database, thereby specifying the physical port or the virtual port.

Furthermore, in the second exemplary embodiment, the forwarding database storage unit is implemented by the FDB storage unit 430. The traffic management table storage unit is implemented by the traffic management table storage unit 540. The forwarding database registration unit is implemented by the frame switch 41a.

In the above-described embodiments, the node according to the invention includes processing units, such as the frame switch 41 (or the frame switch 41a) and the LAG management unit 48, but the invention is not limited thereto. The node may include a computer and a storage device beforehand, and a program for the node that is stored in the storage device may allow the computer to execute the functions of the processing units.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A node that is connected to other nodes by a plurality of links, the node comprising:
a first virtual port storage unit that stores a correspondence between a virtual port, which is a group of a plurality of physical ports connected to the links between the nodes, and the physical ports belonging to the virtual port;
a second virtual port storage unit that stores a correspondence between a host virtual port, which is a group of a plurality of virtual ports, and the plurality of virtual ports belonging to the host virtual port; and
a frame destination determining unit that determines a physical port of the node for transmitting a received frame,
wherein the frame destination determining unit includes:
a port specifying unit that specifies physical ports that do not belong to any virtual port, or the virtual port, which is a group of a plurality of physical ports, referring to the first virtual port storage unit and the second virtual port storage unit in correspondence with a destination of the received frame;
a physical port specifying unit that specifies the physical ports connected to the link which is not out of order, among the physical ports belonging to the virtual port, when the port specifying unit specifies the virtual port; and
a physical port determining unit that determines one of the physical ports specified by the physical port specifying unit as the port for transmitting the frame.

2. The node according to claim 1,
wherein the frame destination determining unit further includes:
a host virtual port specifying unit that, when the physical port specifying unit cannot specify the physical ports connected to the link which is not out of order among the physical ports belonging to the virtual port, specifies the host virtual port including the virtual port;
a client virtual port specifying unit that specifies the virtual ports belonging to the host virtual port specified by the host virtual port specifying unit; and
a virtual port determining unit that uniquely determines the virtual port according to the destination and source of the received frame, among the virtual ports specified by the client virtual port specifying unit, wherein
when the port specifying unit specifies the virtual ports and the virtual port determining unit determines the virtual port, the physical port specifying unit specifies the physical ports connected to the link which is not out of order, among the physical ports belonging to the virtual port.

3. The node according to claim 2, further comprising:
a forwarding database storage unit that stores a forwarding database in which the physical ports or the virtual ports are associated with output information indicating the port for transmitting the frame to a frame destination;
an output port management table storage unit that stores an output port management table, which is a database in which the physical ports for receiving frames are associated with the physical ports or the virtual ports serving as the output information;

an output port management table registration unit that registers, in the output port management table, the physical ports, which are associated with the virtual port including the physical ports in the first virtual port storage unit, and the virtual port including the physical ports such that the physical ports and the virtual port are associated with each other, and registers, in the output port management table, physical ports that do not belong to any virtual port such that the physical ports are associated with their own physical port; and a forwarding database registration unit that, when a frame is received, searches a physical port or a virtual port corresponding to the physical port receiving the frame from the output port management table, and registers, in the forwarding database, the searched physical port or virtual port as the output information and the source of the received frame as the destination such that the destination and the output information are associated with each other, wherein the port specifying unit searches a physical port or a virtual port corresponding to the destination of the received frame from the forwarding database, thereby specifying the physical port or the virtual port.

4. The node according to claim 3, wherein the frame destination determining unit includes:

a broadcast frame transmission port selecting unit that, when a broadcast frame is received, selects a physical port or a virtual port corresponding to the physical port receiving the broadcast frame, when the broadcast frame transmission port selecting unit selects the virtual port, the physical port specifying unit specifies physical ports connected to the link that is not out of order among the physical ports belonging to the virtual port.

5. The node according to claim 4, wherein, when the physical port receiving the broadcast frame belongs to any virtual port, which is a group of a plurality of physical ports, the broadcast frame transmission port selecting unit selects the virtual port that is set in the node, does not include the physical port receiving the broadcast frame, and does not belong to any host virtual port, which is a group of a plurality of virtual ports, and the physical ports that do not belong to any virtual port, which is a group of a plurality of physical ports, and when the physical port receiving the broadcast frame does not belong to any virtual port, which is a group of a plurality of physical ports, the broadcast frame transmission port selecting unit selects the virtual port that is set in the node and does not belong to any host virtual port, which is a group of a plurality of virtual ports, and physical ports other than the physical port receiving the broadcast frame, among the physical ports that do not belong to any virtual port, which is a group of a plurality of physical ports.

6. The node according to claim 2, wherein the frame destination determining unit includes:

a broadcast frame transmission port selecting unit that, when a broadcast frame is received, selects a physical port or a virtual port corresponding to the physical port receiving the broadcast frame, when the broadcast frame transmission port selecting unit selects the virtual port, the physical port specifying unit specifies physical ports connected to the link that is not out of order among the physical ports belonging to the virtual port.

7. The node according to claim 6, wherein, when the physical port receiving the broadcast frame belongs to any virtual port, which is a group of a plurality of physical ports, the broadcast frame transmission port selecting unit selects the virtual port that is set in the node, does not include the physical port receiving the broadcast frame, and does not belong to any host virtual port, which is a group of a plurality of virtual ports, and the physical ports that do not belong to any virtual port, which is a group of a plurality of physical ports, and when the physical port receiving the broadcast frame does not belong to any virtual port, which is a group of a plurality of physical ports, the broadcast frame transmission port selecting unit selects the virtual port that is set in the node and does not belong to any host virtual port, which is a group of a plurality of virtual ports, and physical ports other than the physical port receiving the broadcast frame, among the physical ports that do not belong to any virtual port, which is a group of a plurality of physical ports.

8. A node that is connected to other nodes by a plurality of links, the node comprising:

a first virtual port storage unit that stores a correspondence between a virtual port, which is a group of a plurality of physical ports connected to the links between the nodes, and the physical ports belonging to the virtual port;

a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame, wherein the frame destination determining unit includes:

a port specifying unit that specifies physical ports that do not belong to any virtual port, the virtual ports, which are groups each comprising a plurality of physical ports, or the host virtual port, which is a group of a plurality of virtual ports, referring to the first virtual port storage and the second virtual port storage in correspondence with a destination of the received frame, a physical port specifying unit that specifies the physical ports connected to the link which is not out of order, among the physical ports belonging to the virtual port, when the port specifying unit specifies the virtual port, and a physical port determining unit that determines one of the physical ports specified by the physical port specifying unit as the port for transmitting the frame, and the frame destination determining unit further specifies the virtual ports belonging to the host virtual port, when specifying the host virtual port.

9. The node according to claim 8, wherein the frame destination determining unit further includes:

a host virtual port specifying unit that, when the physical port specifying unit cannot specify the physical ports connected to the link which is not out of order among the physical ports belonging to the virtual port, specifies the host virtual port including the virtual port;

a client virtual port specifying unit that specifies the virtual ports belonging to the host virtual port specified by the host virtual port specifying unit or the virtual ports belonging to the host virtual port, which is a group of a plurality of virtual ports, specified by the port specifying unit; and a virtual port determining unit that uniquely determines the virtual port according to the destination and source of the received frame, among the virtual ports specified by the client virtual port specifying unit, wherein when the port specifying unit specifies the virtual ports, which are groups each comprising a plurality of physical ports, and the virtual port determining unit determines the virtual port, which is a group of a plurality of physical ports, the physical port specifying unit specifies the physical ports connected to the link which is not out of order, among the physical ports belonging to the virtual port.

10. The node according to claim 9, further comprising:

a forwarding database storage unit that stores a forwarding database in which the physical ports, the virtual ports, which are groups each comprising a plurality of physical ports, or the host virtual port, which is a group of a plurality of virtual ports, are associated as output information indicating the port for transmitting the frame with a combination of the destination of the frame and a traffic identifier of the frame;

a traffic management table storage unit that stores a traffic management table, which is a database in which the traffic identifier of the frame is associated with the physical port or the virtual port serving as the output information; and a forwarding database registration unit that, when a frame is received, searches a physical port or a virtual port corresponding the traffic identifier of the frame from the traffic management table, and registers, in the forwarding database, the searched physical port or virtual port, serving as the output information, and a combination of the destination of the received frame and the traffic identifier of the frame such that the combination and the output information are associated with each other, wherein the host virtual port, which is a group of a plurality of virtual ports, may be associated with the traffic identifier in the traffic management table, and the port specifying unit searches a physical port or a virtual port corresponding to the destination of the received frame from the forwarding database, thereby specifying the physical port or the virtual port.

11. The node according to claim 10, wherein the frame destination determining unit includes:

a broadcast frame transmission port selecting unit that, when a broadcast frame is received, selects a physical port or a virtual port corresponding to the physical port receiving the broadcast frame, when the broadcast frame transmission port selecting unit selects the virtual port, the physical port specifying unit specifies physical ports connected to the link that is not out of order among the physical ports belonging to the virtual port.

12. The node according to claim 11, wherein, when the physical port receiving the broadcast frame belongs to any virtual port, which is a group of a plurality of physical ports, the broadcast frame transmission port selecting unit selects the virtual port that is set in the node, does not include the physical port receiving the broadcast frame, and does not belong to any host virtual port, which is a group of a plurality of virtual ports, and the physical ports that do not belong to any virtual port, which is a group of a plurality of physical ports, and when the physical port receiving the broadcast frame does not belong to any virtual port, which is a group of a plurality of physical ports, the broadcast frame transmission port selecting unit selects the virtual port that is set in the node and does not belong to any host virtual port, which is a group of a plurality of virtual ports, and physical ports other than the physical port receiving the broadcast frame, among the physical ports that do not belong to any virtual port, which is a group of a plurality of physical ports.

13. The node according to claim 9, wherein the frame destination determining unit includes:

a broadcast frame transmission port selecting unit that, when a broadcast frame is received, selects a physical port or a virtual port corresponding to the physical port receiving the broadcast frame, when the broadcast frame transmission port selecting unit selects the virtual port, the physical port specifying unit specifies physical ports connected to the link that is not out of order among the physical ports belonging to the virtual port.

14. The node according to claim 13, wherein, when the physical port receiving the broadcast frame belongs to any virtual port, which is a group of a plurality of physical ports, the broadcast frame transmission port selecting unit selects the virtual port that is set in the node, does not include the physical port receiving the broadcast frame, and does not belong to any host virtual port, which is a group of a plurality of virtual ports, and the physical ports that do not belong to any virtual port, which is a group of a plurality of physical ports, and when the physical port receiving the broadcast frame does not belong to any virtual port, which is a group of a plurality of physical ports, the broadcast frame transmission port selecting unit selects the virtual port that is set in the node and does not belong to any host virtual port, which is a group of a plurality of virtual ports, and physical ports other than the physical port receiving the broadcast frame, among the physical ports that do not belong to any virtual port, which is a group of a plurality of physical ports.

15. A communication method that is applied to a node that is connected to other nodes by a plurality of links, the node including: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame, the frame destination determining unit includes a port specifying unit, a physical port specifying unit and a physical port determining unit, the communication method comprising:

specifying, using the port specifying unit, physical ports that do not belong to any virtual port, or the virtual port, which is a group of a plurality of physical ports, referring to the first virtual port storage unit and the second virtual port storage unit in correspondence with a destination of the received frame;

specifying, using the physical port specifying unit, the physical ports connected to the link which is not out of order, among the physical ports belonging to the virtual port, when the ort specifying unit specifies the virtual port; and determining, using the physical port determining unit, one of the physical ports specified by the physical port specifying unit as the port for transmitting the frame.

16. A communication method that is applied to a node that is connected to other nodes by a plurality of links, the node including: a first virtual port storage unit that stores a correspondence between a virtual port, which is a group of a plurality of physical ports connected to the links between the nodes, and the physical ports belonging to the virtual port; a second virtual port storage unit that stores a correspondence between a host virtual port, which is a group of a plurality of virtual ports, and the plurality of virtual ports belonging to the host virtual port; and a frame destination determining unit that determines a physical port of the node for transmitting a received frame, the frame destination determining unit includes a port specifying unit, a physical port specifying unit and a physical port determining unit, the communication method comprising:
    specifying, using the port specifying unit, physical ports that do not belong to any virtual port, the virtual ports, which are groups each comprising a plurality of physical ports, or the host virtual port, which is a group of a plurality of virtual ports, referring to the first virtual port storage unit and the second virtual port storage unit in correspondence with a destination of the received frame;
    specifying the host virtual port, which is a group of a plurality of virtual ports, and further specifying the virtual ports belonging to the host virtual port;
    specifying the virtual port, which is a group of a plurality of physical ports;
    specifying, using the physical port specifying unit, the physical ports connected to the link which is not out of order, among the physical ports belonging to the virtual port, when the port specifying unit specifies the virtual port; and
    determining, using the physical port determining unit, one of the physical ports specified by the physical port specifying unit as the port for transmitting the frame.

17. A storage device storing a program for a node that allows a computer including a node that is connected to other nodes by a plurality of links and includes a first virtual port storage unit that stores a correspondence between a virtual port, which is a group of a plurality of physical ports connected to the links between the nodes, and the physical ports belonging to the virtual port and a second virtual port storage unit that stores a correspondence between a host virtual port, which is a group of a plurality of virtual ports, and the plurality of virtual ports belonging to the host virtual port to execute a frame destination determining process of:
    specifying physical ports that do not belong to any virtual port, or the virtual port, which is a group of a plurality of physical ports, in correspondence with a destination of a received frame; and
    when specifying the virtual port, determining, as the port for transmitting the frame, the physical port connected to a link that is not out of order, among the physical ports belonging to the specified virtual port.

18. A storage device storing a program for a node that allows a computer including a node that is connected to other nodes by a plurality of links and includes a first virtual port storage unit that stores a correspondence between a virtual port, which is a group of a plurality of physical ports connected to the links between the nodes, and the physical ports belonging to the virtual port and a second virtual port storage unit that stores a correspondence between a host virtual port, which is a group of a plurality of virtual ports, and the plurality of virtual ports belonging to the host virtual port to execute a frame destination determining process of:
    specifying physical ports that do not belong to any virtual port, the virtual ports, which are groups each comprising a plurality of physical ports, or the host virtual port, which is a group of a plurality of virtual ports, in correspondence with a destination of a received frame;
    when specifying the host virtual port, which is a group of a plurality of virtual ports, further specifying the virtual ports belonging to the host virtual port; and
    when specifying the virtual port, which is a group of a plurality of physical ports, determining, as the port for transmitting the frame, the physical port that is connected to a link that is not out of order, among the physical ports belonging to the specified virtual port.

* * * * *